(12) United States Patent
Deck et al.

(10) Patent No.: US 8,374,933 B2
(45) Date of Patent: Feb. 12, 2013

(54) METHOD FOR EDUCATIONAL FINANCIAL PLANNING

(75) Inventors: Nancy Deck, Washington, DC (US);
Ryan Draude, Fairfax, VA (US); Barry Feierstein, Cabin John, MD (US);
Michael Garvey, Boyds, MD (US);
Cara Hayes, Sterling, VA (US); Christy Lynn Marble, Friday Harbor, WA (US);
Nicole Ogburn, Broadlands, VA (US);
Eric Woodall, Sterling, VA (US)

(73) Assignee: Sallie Mae, Inc., Fishers, IN (US)

( * ) Notice: Subject to any disclaimer, the term of this patent is extended or adjusted under 35 U.S.C. 154(b) by 527 days.

(21) Appl. No.: 12/613,117

(22) Filed: Nov. 5, 2009

(65) Prior Publication Data
US 2010/0131406 A1  May 27, 2010

Related U.S. Application Data

(60) Provisional application No. 61/111,606, filed on Nov. 5, 2008.

(51) Int. Cl.
*G06Q 40/00* (2006.01)

(52) U.S. Cl. ............................................ 705/35; 705/38

(58) Field of Classification Search .................... 705/35, 705/36 T, 38, 327; 715/760
See application file for complete search history.

(56) References Cited

U.S. PATENT DOCUMENTS

| | | | |
|---|---|---|---|
| 5,809,484 A * | 9/1998 | Mottola et al. | 705/36 R |
| 6,424,952 B1 * | 7/2002 | Yinbal | 705/36 R |
| 7,158,950 B2 * | 1/2007 | Snyder | 705/35 |
| 7,398,235 B1 * | 7/2008 | Westrick | 705/35 |
| 7,421,408 B2 * | 9/2008 | Ryder | 705/36 R |
| 7,680,729 B2 * | 3/2010 | Thornton | 705/38 |
| 2004/0078312 A1 * | 4/2004 | Bush et al. | 705/35 |
| 2004/0210822 A1 * | 10/2004 | Kotler et al. | 715/500 |
| 2004/0236652 A1 * | 11/2004 | Heiges et al. | 705/35 |
| 2005/0060253 A1 * | 3/2005 | Paulsen-Dziuk et al. | 705/35 |
| 2005/0214729 A1 * | 9/2005 | Greenly et al. | 434/307 R |
| 2006/0155617 A1 * | 7/2006 | Dasilva | 705/30 |
| 2007/0112669 A1 * | 5/2007 | Snyder | 705/38 |
| 2007/0124240 A1 * | 5/2007 | Ireland et al. | 705/38 |

OTHER PUBLICATIONS

John K. McGill; Dental Economics; "When and How to Save, Invest, and Pay for College"; Oct. 2008; pp. 1-3.*
Michele Conklin; Special to the Denver Post; "ABC of college financing Early planning helps reveal funding sources; [Rockies Edition]"; Sep. 12, 1994; pp. 1-3.*
Stine, Glen R.; "Developing a Strategic Financial Plan for a Major State University: An Analysis of the Financial Planning of the University of Massachusetts At Amherst"; Harvard University; 1983; pp. 1 and 2.*
Cirtin, Arnold and Lightfoot, Connie; "Financial statement analysis for private colleges and universities"; National Public Accountant, v41,n8; Aug. 1996; pp. 1-4.*

* cited by examiner

*Primary Examiner* — Ella Colbert
(74) *Attorney, Agent, or Firm* — Faegre Baker Daniels LLP

(57) ABSTRACT

A method is provided that gathers information from a user regarding a desired educational institution and sources for financing an education at the educational institution. The method further estimates a future income and compares the income with the obligations that arise from financing the education. This comparison is subsequently classified according to a risk profile.

13 Claims, 39 Drawing Sheets

SallieMae | Education Finance Advisor

Log In | Help | Contact Us

Your information and this browser session is secured with 128-bit encryption

Your Sallie Mae Education Financial Advisor Plan

☑ Student Information | ⬡ School Costs | ⬡ How to Pay | ⬡ Loan Repayment

Estimating School Costs - Selecting a School

The first step in putting together a financial plan for a further education is determining the "true cost" of attending school. True cost is defined as the total combination of tuition AND living expenses - costs outside of tuition itself. Based on your input, this tool will project costs for the remaining years you plan on attending.

Answer the questions below to calculate annual tuition costs:

School Location — 61 — [Don't Know / Not Sure ▽]
School Type           [4-year Public University or College ▽]
                     What if I have a specific school? — 62
Resident Status — 63 — [Out-Of-State ▽]
Enrollment Status      [Full-time ▽]
Start Date             [Fall ▽] [2008 ▽]
Number of Years — 64 — [4 ▽]   — 65
Attending School
Course of Study        [Mathematics ▽]

[< Back]  [Next > Related School Costs] — 68

Related Resources from Sallie Mae

Looking for the right school?

Learn more about finding the best school for your needs on SallieMae.com.

You might be surprised at the number of schools that would be a great fit for your educational needs!

Sallie Mae Education Financial Advisor © 2008 All Rights Reserved

Privacy Policy | Terms & Conditions for Use

SallieMae | Education Finance Advisor  Log In | Help | Contact Us

Your information and this browser session is secured with 128-bit encryption

View My Plans | Save Plan | ...

Your Sallie Mae Education Financial Advisor Plan

Student Information | School Costs | How to Pay | Loan Repayment

Estimating School Costs - Tuition and Living Expenses

Estimated costs to attend Northwestern University

Note: Pre-filled amounts are provided by a third party data source *. Change any editable amount to match your personal information if you know it.

| | | |
|---|---|---|
| Tuition and fees | $ 35,229 | ⓘ 71 |
| Average Annual Room & Board | $ 10,776 | ⓘ 72 |
| Additional Annual Fees for Full-time Students | $ 200 | ⓘ 73 |
| Average Annual Cost of Books & Supplies | $ 1,419 | ⓘ 74 |

Reset Amounts — 75

Total annual tuition costs = $35,229
Total annual non-tuition costs = $12,395
Total combined annual costs = $47,624 ⓘ — 77

[ < Back ]  [ Next > View 4 Year School Costs ]

Related Resources from Sallie Mae

Learn how to live within your means while in school -- these simple tips could end up saving you a lot of money and start you on the way to a strong financial future.

— 76

* University Data is copyrighted material under license to Wintergreen Orchard House, a division of Alloy Education, and which is reproduced in this publication by permission of Wintergreen Orchard House. Copyright 2008 by Wintergreen Orchard House. All rights reserved.

Sallie Mae Education Financial Advisor © 2008 All Rights Reserved    Privacy Policy | Terms & Conditions for Use

SallieMae | Education Finance Advisor          Log In | Help | Contact Us

View My Plans  | Save Plan | Share Plan | Create PDF of Plan | Create New Plan |   Your information and this browser session
                                                                                  is secured with 128-bit encryption Your Sallie Mae Education Financial Advisor Plan ✓ Student Information  ✓ School Costs  ◇ How to Pay  ⊗ Loan Repayment       Plan Data  Plan Results
                                                                              pdf       view How to Pay For School Free aid for college is available from a variety of sources and offered as scholarships or
grants. Both are an attractive way to pay because you do not need to repay the money.

Free Aid Source          101  Yearly Contribution              Related Resources
                                                                 from Sallie Mae — 106
State Awarded Grants     102  $ [0]      [Enter Award Details]
& Scholarships                                                 Free money was never
                                                               easier to find
School Awarded Grants    103  $ [0]      [Enter Award Details]
& Scholarships                                                 Search over 2.8 million
                                                               scholarships worth over $16
Other Scholarships & Grants   $ [0]      [Enter Award Details] billion! It's free and easy;
                                         104                  you could find awards that
Federal Pell Grant Amount     $ [0]                            can help you pay for school.

Total award amounts = $0 — 105

[< Back]   [Next > Review How to Pay Totals] — 108

Sallie Mae Education Financial Advisor © 2008 All Rights Reserved    Privacy Policy | Terms & Conditions for Use 100
106
108

SallieMae

Home | About us | Contact us | Find [    ] [Go]

Planning and preparing for school

Before college > Getting a loan > After graduation >
> en espanol

Sallie Mae Education Financial Advisor

✓ Helping students plan
Preparing for school
Selecting a school
Finding free money
Finding ways to pay
✓ Education Financial Advisor
Create your financial plan
Returning user log-in > Helping parents plan
Understanding the costs
Assessing your financial needs
Finding free money
Finding ways to pay
Education Financial Advisor > Planning wisely
Saving for college
Be debt savvy No matter where you are in the process of securing financial aid for college or a trade school, Sallie Mae's Education Financial Advisor can help you create a detailed plan.

View shared education financial plans
Friends and family individuals who have completed an Education Financial Advisor (EFA) plan can access the plan by answering the question below:

What is the name of the family pet? — 301
[                    ] — 302

[Submit]

Upon log-in, your information and this browser session will be secured with 128-bit encryption 🔒

Create Your Own Account. Those who would like to have their own account may begin using EFA here.

SallieMae Education Investment Planner for State University

Janet Doe-Freshman-Bachelor of Arts in Accounting — State University-2010-2011 academic year Edit account | Contact

2010-2011 Financial aid award

Download award letter

Scholarship and grant amounts are money that you are not obligated to payback.

Some grants and scholarships have specific criteria that needs to be met or maintained, such as a grade point average for an academic scholarship - to view the criteria for a specific award, click on this icon or view a complete summary of your personal scholarship and grant award criteria.

| AWARD TYPE | AMOUNT | INCLUDE IN PAYMENT PLAN? |
|---|---|---|
| Scholarship & grants | | |
| Federal Pell Grant | $1,300 | ⦿ Yes ○ No |
| State Grant | $4,000 | ⦿ Yes ○ No |
| Quest Scholarship (Academic) | $2,000 | ⦿ Yes ○ No |
| Work Study award | | |
| Federal Work Study | $3,000 | ⦿ Yes ○ No |
| Federal loan awards | | |
| Federal Subsidized Stafford Loan | $3,500 | ⦿ Yes ○ No |
| Total awards | $13,500 | More detail |

Save plan

Continue to paying the balance ▷

Paying for freshman year
- total cost of attendance
- financial aid award package
- paying for any unfunded balance
- final, 2010-2011 funding plan
- Overall program investment
- Action plan & counseling

STATE UNIVERSITY

About this website | Manage Your Account | Contact | Terms & Conditions

METHOD FOR EDUCATIONAL FINANCIAL PLANNING

PRIORITY

The present application is a non-provisional application of and claims priority to U.S. Provisional Application Ser. No. 61/111,606, filed Nov. 5, 2008, the disclosure of which is hereby expressly incorporated by reference.

FIELD

The present disclosure relates to an apparatus and method for financial planning in the realm of higher education. More particularly, the present disclosure is directed to an apparatus and method for receiving information from a user and providing graphical and/or interactive tools allowing the user to understand various options for the financing of higher education.

BACKGROUND AND SUMMARY

The cost of secondary education has increased significantly in recent years. As a consequence, many students apply for assistance in the form of financial aid and grants. Indeed, a student is likely to call on financial resources from a variety of sources. Determining how much funds are needed and determining the available funding sources are often not readily available in an easy to understand interface. Accordingly, students may be left with little or no plan as to how to fund education.

Additionally, once funding sources are found and evaluated, many available calculators can show a student the expected monthly payment for any borrowed funds. However, many students are devoid of a reference point so as to be able to presently assess the affordability of such future payments.

According to one embodiment of the present disclosure, a method of electronically forming a customized educational financing plan is provided including the steps of presenting an educational financing planning website to a user, the website providing educational financing planning for a student; electronically obtaining educational institution information from the user, the information identifying an educational institution for which financial planning is desired, the information including an intended course of study; determining educational funding sources for the student including loans; determining a repayment amount for the loans; estimating a future income of the student at least partially based upon the identified intended course of study; comparing the repayment amount for the loans to the estimated future income; and classifying the plan as a specific risk level based upon the result of the comparing step; providing a data stream for displaying the plan and the risk level to the user.

According to another embodiment of the present disclosure, a method of electronically forming a customized educational financing plan is provided including the steps of: presenting an educational financing planning website to a user, the website providing educational financing planning for a student; electronically obtaining educational institution information from the user, the information identifying a first educational institution for which financial planning is desired, the information identifying an expected year of enrollment at the first institution; determining an expected cost for attending the first institution, the determination of expected cost being at least partially based on the identified first educational institution and the expected year of enrollment; obtaining information regarding the current educational savings, expected future educational savings contributions, and an expected rate of savings appreciation; determining expected educational savings that will be available at the time of enrollment, the determination of expected educational savings being at least partially based on the current educational savings, expected future educational savings contributions, and an expected rate of savings appreciation; providing for graphically displaying the expected educational savings that will be available at the time of enrollment relative to the expected cost for attending the first institution.

According to another embodiment of the present disclosure, a method of electronically forming a customized educational financing plan is provided including the steps of: presenting an educational financing planning website to a user, the website providing educational financing planning for a student; electronically obtaining first educational institution information from the user, the information identifying a first educational institution for which financial planning is desired, the information identifying an expected year of enrollment at the first institution; determining an expected cost for attending the first institution, the determination of expected cost being at least partially based on the identified first educational institution and the expected year of enrollment; electronically importing grant and loan award information from a financial aid award letter for the first educational institution; electronically obtaining second educational institution information from the user, the information identifying a second educational institution for which financial planning is desired, the information identifying an expected year of enrollment at the second institution; determining an expected cost for attending the second institution, the determination of expected cost being at least partially based on the identified second educational institution and the expected year of enrollment; electronically importing grant and loan award information from a financial aid award letter for the second educational institution; determining the net costs of attending the first and second educational institutions; and providing for the displaying of the costs, award information, and net costs for the first and second educational institutions.

According to another embodiment of the present disclosure, a method of managing loans is provided including: electronically importing a loan portfolio of a user; providing for the display of a plurality of repayment options for the loan portfolio; receiving input indicative of the choosing of one of the repayment options by a user; and automatically implementing the chosen repayment option for the user in response to receiving the input.

BRIEF DESCRIPTION OF THE DRAWINGS

The above mentioned and other features and objects of this disclosure, and the manner of attaining them, will become more apparent and the disclosure itself will be better understood by reference to the following description of an embodiment taken in conjunction with the accompanying drawings, wherein:

FIG. 4 shows the page of FIG. 3 with example information filled in;

FIG. 5 shows a page of the system of FIG. 1 where information about an educational institution is entered, example information is filled in;

FIG. 6 shows a page of the system of FIG. 1 where a user has indicated at the page of FIG. 5 that he/she is unsure as to the educational institution;

FIG. 7 shows a page of the system of FIG. 1 where estimated costs and fees for an indicated institution are presented to the user;

FIG. 9 shows a page of the system of FIG. 1 where information about educational savings is entered;

FIG. 10 shows a page of the system of FIG. 1 where free educational aid sources and their amounts are entered;

FIG. 13 shows a page of the system of FIG. 1 where details regarding parties who are available to potentially take out loans to finance the education;

FIG. 14 shows a page of the system of FIG. 1 where the amount of Federal Loans are configured;

FIG. 21 shows a page of the system of FIG. 1 where the loan repayment calculation of FIG. 20 is compared with an expected income of the student that results in a determination of low risk;

FIG. 30 shows a page of the system of FIG. 1 where a second user identified via the page of FIG. 29 is authenticated to allow viewing of a shared educational financing plan FIG. 31 shows a page of the system of FIG. 1 where the user is able to start an educational savings plan;

Figure 32:
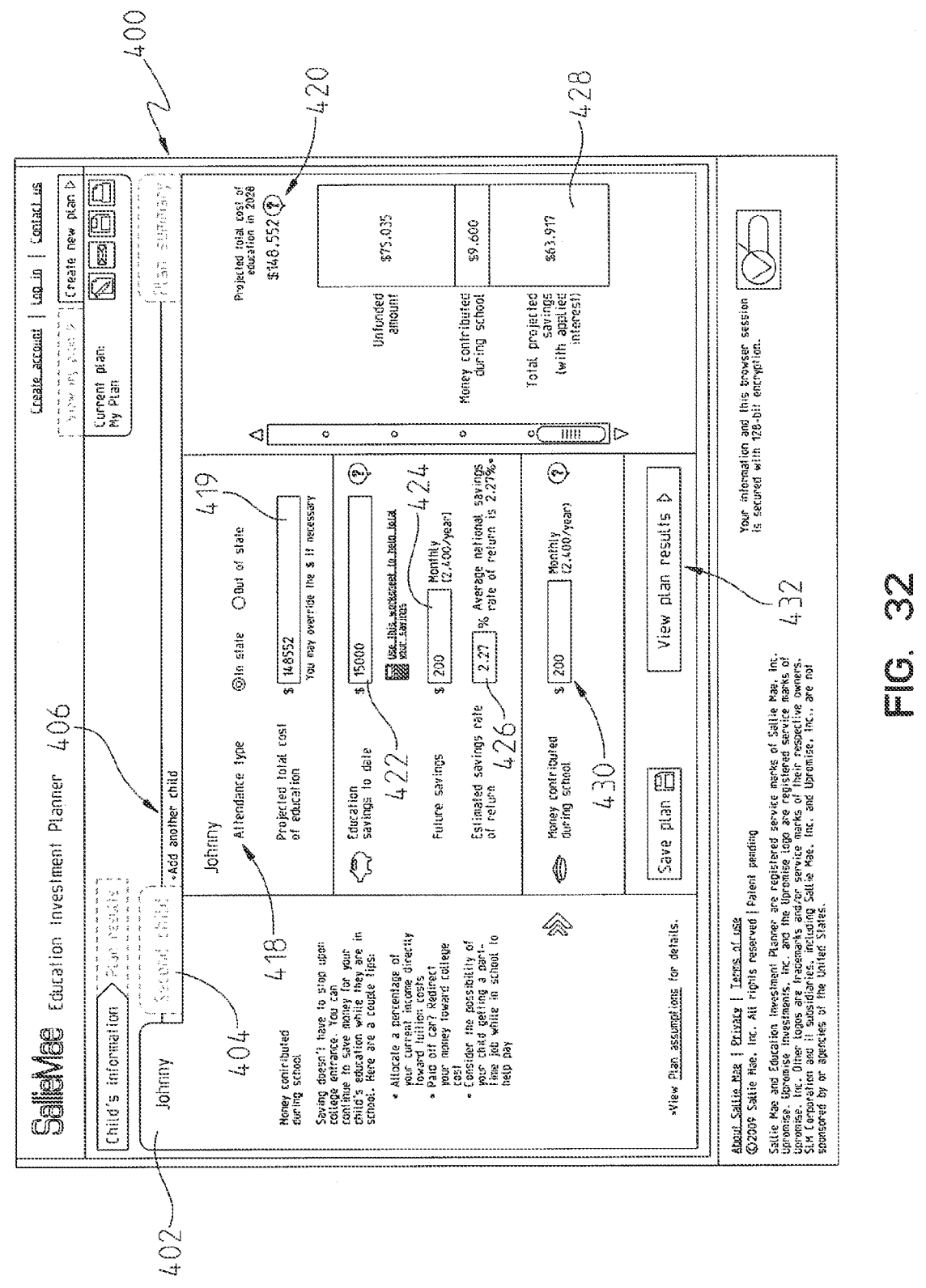

FIG. 32 is a second view of the page of FIG. 31;

FIG. 34 is a page of the system of FIG. 1 where the user is able to download information from an actual financial aid award letter and choose to integrate that information into a funding plan;

FIG. 35 is a page of the system of FIG. 1 where the user is able to compare financial aspects of multiple educational options; and FIG. 36 is a page of the system of FIG. 1 where the user is able to adjust re-payment options and consider the options as they relate to the user's income and expenses.

Figure 1:
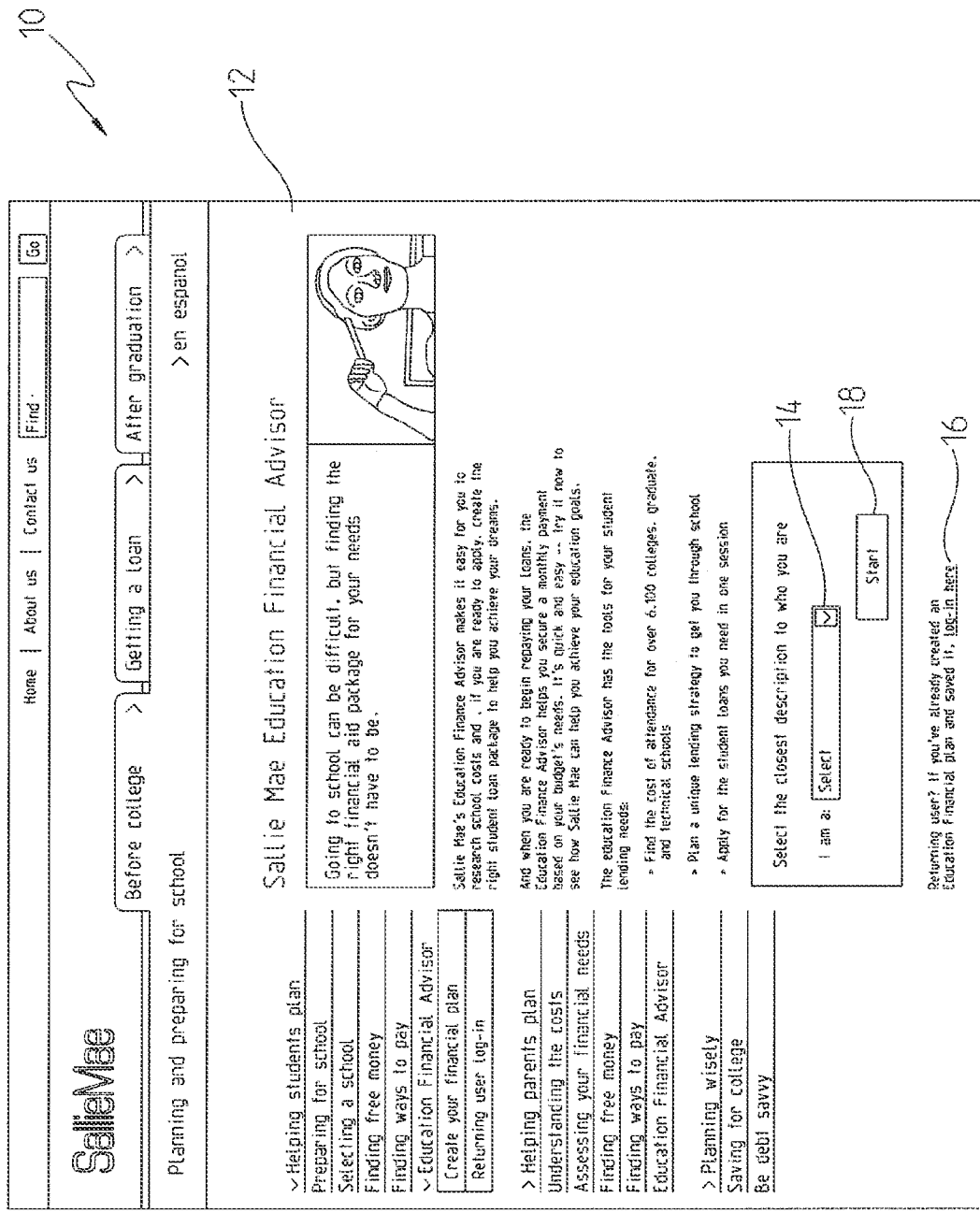
FIG. 1 illustrates a starting page of a system that collects information about a user to create an educational financing plan.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The present disclosure is related to an apparatus and a method for educational financial planning. The embodiment disclosed below is not intended to be exhaustive or limit the disclosure to the precise form disclosed in the following detailed description. Rather, the embodiment is chosen and described so that others skilled in the art may utilize its teachings. It should be appreciated that while the below description and figures refer to and depict an exemplary user interface and a set of features, the below described example is not intended to limit the claims that follow. Indeed, one skilled in the art readily understands that modifications may be made to the below described system and still be understood to fall within the spirit and scope of the present disclosure.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present disclosure; the operations are machine operations. Useful machines for performing the operations of the present disclosure include general purpose digital computers or other similar devices. In all cases the distinction between the method operations in operating a computer and the method of computation itself should be recognized. The present disclosure relates to a method and apparatus for operating a computer in processing electrical or other (e.g., mechanical, chemical) physical signals to generate other desired physical signals.

The present disclosure also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present disclosure deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. When the PDF accesses a network resource, which typically requires an application program to execute on the remote server, the PDF calls an Application Program Interface, or "API", to allow the user to provide commands to the network resource and observe any output. The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a world wide network of computers, namely the "World Wide Web" or simply the "Web". Examples of Browsers compatible with the present disclosure include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present disclosure may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method). Applets, small source code programs in a browser understandable programming language (for example, the Java programming language), may also be included in the web pages supplied to browsers. Web pages typically include one or more of these various files that the browser interprets and presents to the user.

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a handheld device and a desktop computer either via wires or wirelessly. Synchronization ensures that the data on both the handheld device and the desktop computer are identical.

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data (CDPD") used on the Advance Mobile Phone Service ("AMPS").

The terms "wireless application protocol" or "WAP" mean a universal specification to facilitate the delivery and presentation of web-based data on handheld and mobile devices with small user interfaces.

Referring now to the drawings, FIG. 1 illustrates starting web page 12 of website 10. Website 10 is a collection of a plurality of web pages, including web page 12. While this exemplary embodiment is described as a web based system, systems utilizing dedicated software and/or standalone machines may alternatively be implemented. Such a web based system uses a server computer (not shown) and a user computer or other device (not shown). The server computer is connected to a network, for example, the World Wide Web and responds to queries from user computers. The server either stores or is able to retrieve or build various webpages to be sent to the multiple user computers that are likewise coupled to the network. Accordingly, the server transmits HTML code or other web page files for the below described web pages to the user computer. The user computer has a browser program which may be proprietary software used only for interacting with the server, or may be a more generic browser capable of viewing many different websites and interacting with multiple servers. Alternatively, instead of a user computer, a wireless device such as a PDA or smart phone may be used to receive the web pages and interact with the user. For stand-alone implementations, a single computer has access to both the information of the server and the graphic files for the user interface, and the interaction capability of similar to that of a browser. In other embodiments not described otherwise herein, a combination of local software and network assessible resources may be combined to provide the full functionality similar to the web-based system.

Web page 12, FIG. 1, provides a starting point for both new and returning visitors. Drop-down box 14 allows a new user or a returning user who has not previously created a login ID to start the process of receiving educational financial planning information. Drop-down box 14 allows the user to identify him/herself as a Student, Parent/Guardian, or "other" and then press start button 18 to continue. Link 16 is provided for returning users who have saved information from a previous session to resume the previous session and/or access previously input data and previous results. Link 16 takes users to a screen where a login and password are requested to identify and verify the identity of the user. Returning users are able to pickup the below described process at the any point where they previously left off. Additionally, returning users are able to revisit previously completed parts of the below described process and change previously entered data and view previously viewed pages. Additionally, although not shown, starting page 12 may also include a link to be followed by individuals who are currently repaying loans.

Figure 2:
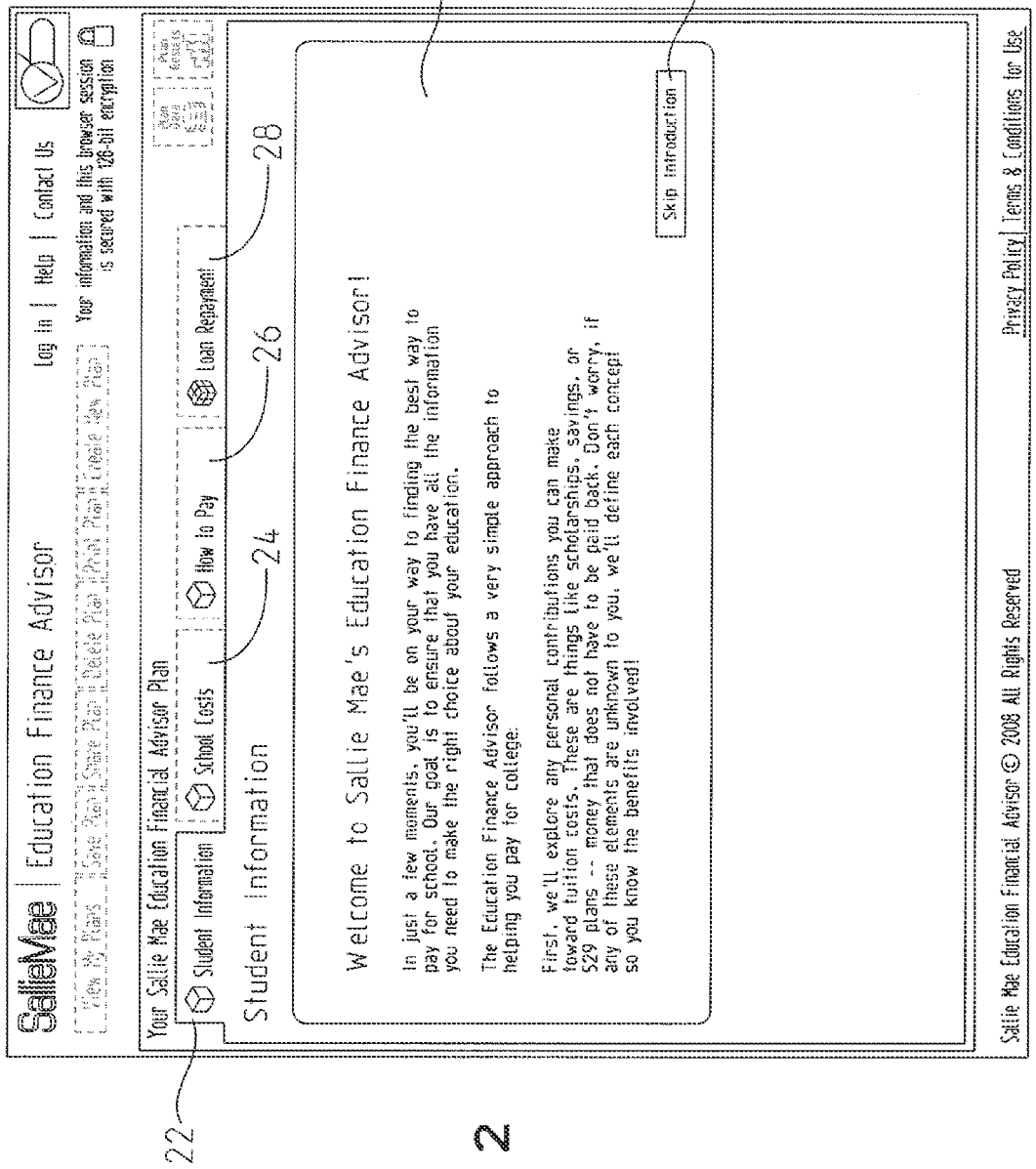
FIG. 2 shows an introduction page for the system of FIG. 1.

Website 10 groups webpages (12, et al.) into four main categories, Student Information (FIG. 2, tab 22), School Costs 24, How To Pay 26, and Loan Repayment 28. Use of drop-down box 14 and start button 18 takes the user to an introduction that begins a data acquisition phase within Student Information tab 22. Animated application overview 21, or introduction, is first presented to the user. The user is also presented with button 23 that allows skipping of introduction/overview 21.

Figure 3:
FIG. 3 shows a page of the system of FIG. 1 where information about a student is entered.
Figure 4:
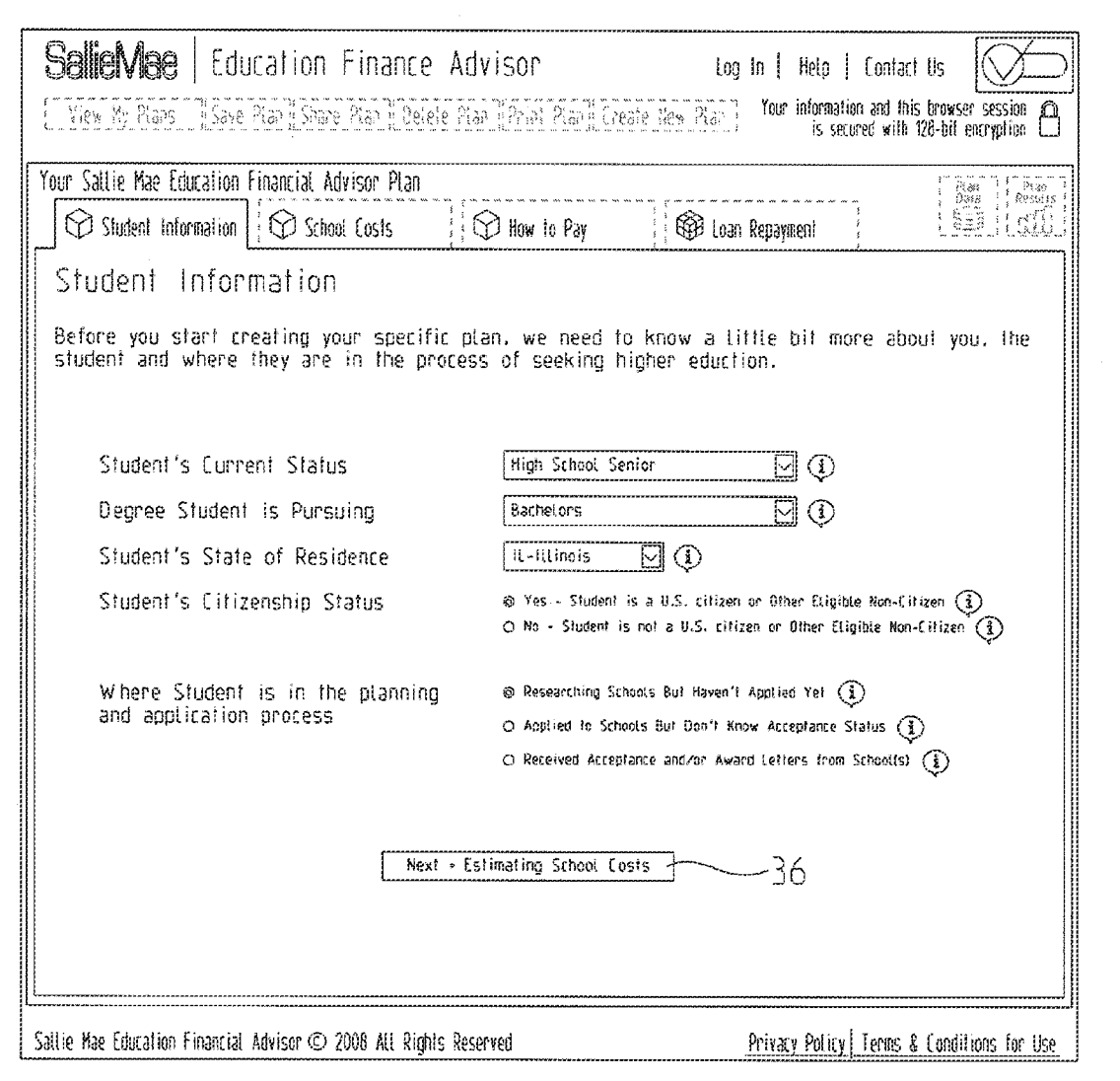

At the conclusion of overview/introduction 21, either by watching it all or use of button 23, the user is presented with information webpage 30 of FIG. 3. The user is then asked to enter the student's current status 31, the degree the student is pursuing 32, the student's state of residence 33, the student's citizenship status 34, and where the student is in the planning process 35. With respect to student's current status 31, the user is presented with choices that include High School Freshman, High School Sophomore, High School Junior, High School Senior, Community College 1st year, Community College 2nd year, Community college 3 or more years, College or University 1st year, College or University 2nd year, College or University 3rd year, College or University 4th year, College or University 5th year or more, Graduate Student, Not currently enrolled, and Other. Once all the requested information is input, such as shown in FIG. 4, the user selects button 36 to continue.

Figure 5:
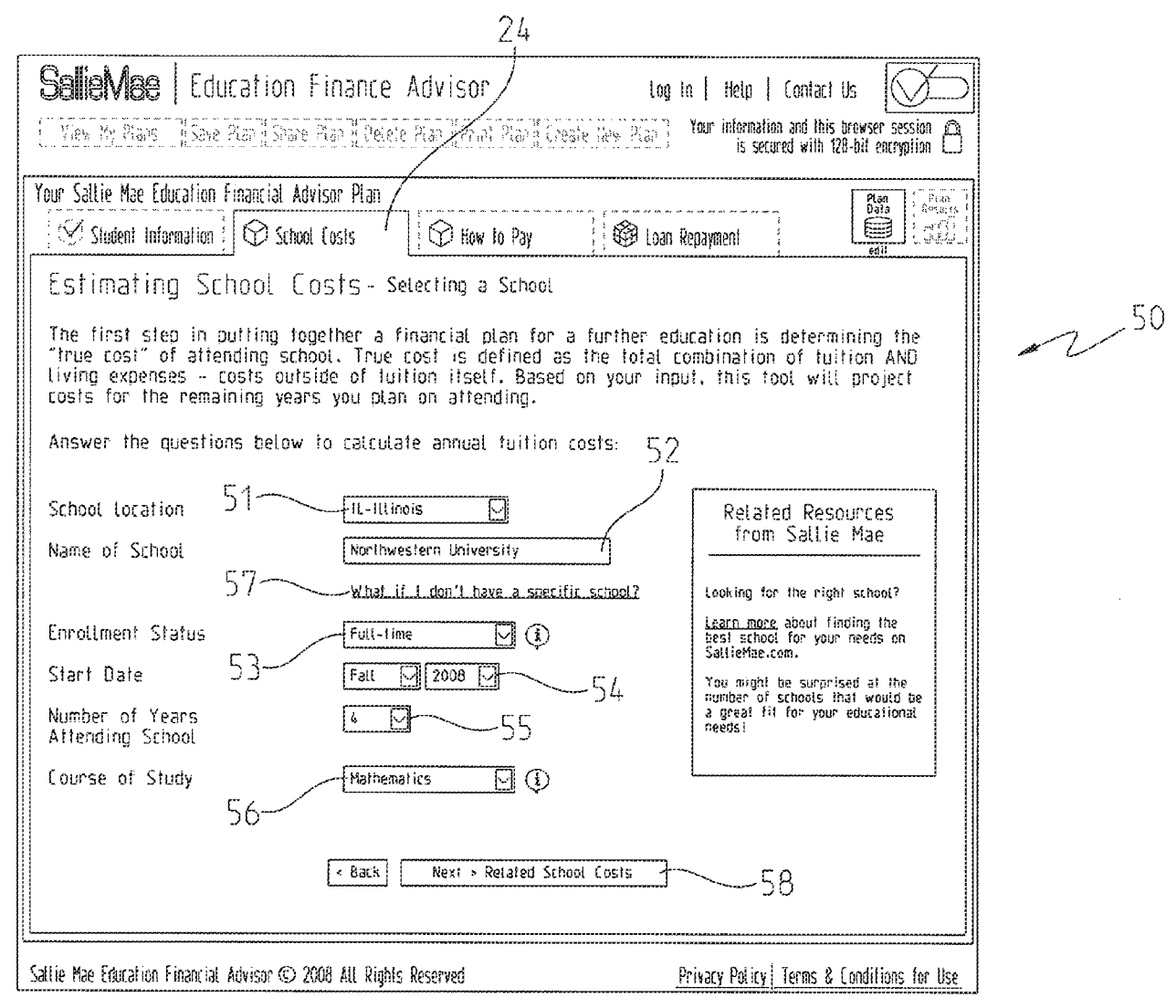

Selection of button 36 takes the user to webpage 50, shown filled in at FIG. 5, that is part of school costs tab 24. Webpage 50 asks the user to input the location of the desired school 51 and then assists the user in entering the name of the school 52 through the use of an auto-complete function with the schools having a matching location as identified at 51. Webpage 50 also gathers information regarding expected enrollment status 53, start date 54, expected years for completion 55, and expected course of study 56. If the user is undecided on a particular school, but would like to continue to receive more general information, link 57 is provided to webpage 60, shown in FIG. 6. Webpage 60 collects information such as school type 61, resident status 62, enrollment status 63, start date 64, number of years attending school 65, and expected course of study 66. Both webpages 50, 60 include button 58, 68 that is selected to continue within the system.

FIG. 7 shows webpage 70 that is displayed when button 58 is selected. Webpage 70 accesses a database of estimated or known educational costs (not shown). The database can be coupled to the server, coupled to a different server, or in the memory of the user's computer. Some values, such as Tuition and Fees 71 and Additional Annual Fees for Full-Time Students 73 are populated from the database and not able to be adjusted by the user. Other values, such as Average Annual Room & Board 72 and Average Annual Cost of Books & Supplies 74 are pre-populated but able to be adjusted by the user. Button 75 is provided to allow selective resetting of any user-changed values to their pre-populated estimates. Total 77 of values 71, 72, 73, 74 is provided as well as button 76 that is selected to continue within the system.

Figure 8:
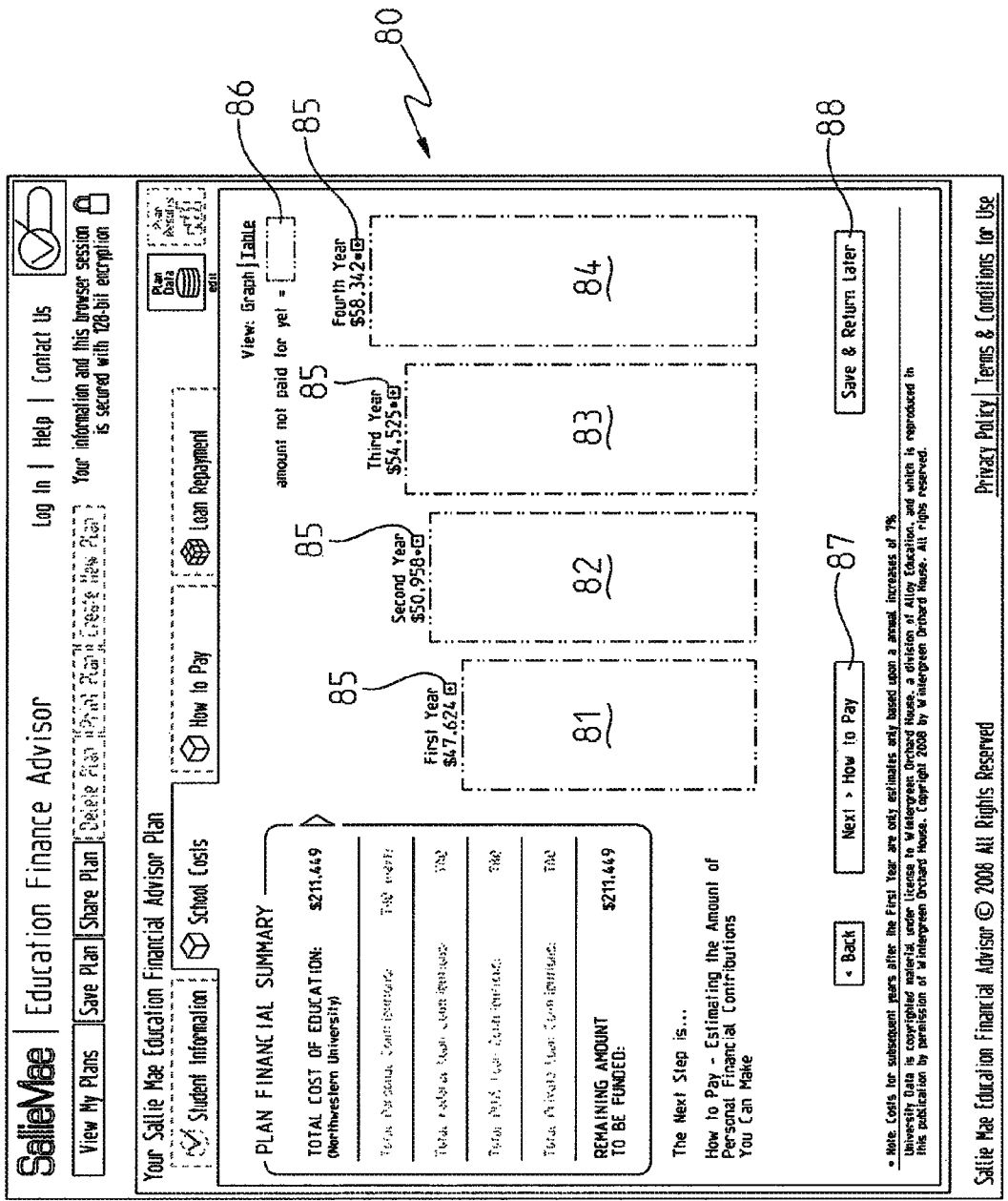
FIG. 8 shows a page of the system of FIG. 1 where the estimated costs and fees of FIG. 7 are presented to the user as bar graphs representative of each year of anticipated schooling.

Selection of button 76 directs the user to webpage 80 shown in FIG. 8. Webpage 80 shows the estimated costs for each of four expected years based upon the indication of four years of schooling 55 on webpage 50. It should be appreciated that if five years was indicated on webpage 50, that webpage 80 would display five years worth of financial data. Each year is displayed as a bar graph-type cost bar 81, 82, 83, 84 showing the expected costs relative to the other years. Each cost bar 81, 82, 83, 84 is topped off with the dollar value that the bar indicates. Each value has expansion icon 85 next to the value. A mouse-over or click upon expansion icon 85 provides a text bubble or window showing the constituent parts of the value, such as values 71, 72, 73, 74. At this point, each bar is shown in a color/pattern 86 shown in the upper right corner to indicate that no funding source has yet been identified to cover these costs. Additionally, the left side of the screen shows the total amount for all four years and the identified funding sources therefor, which at this point are non-existent. Thus, the left side of the screen indicates that the entire amount is remaining to be funded. Button 87 is provided to continue within the system as well as button 88 that allows a user to save the input information for later use.

Figure 9:
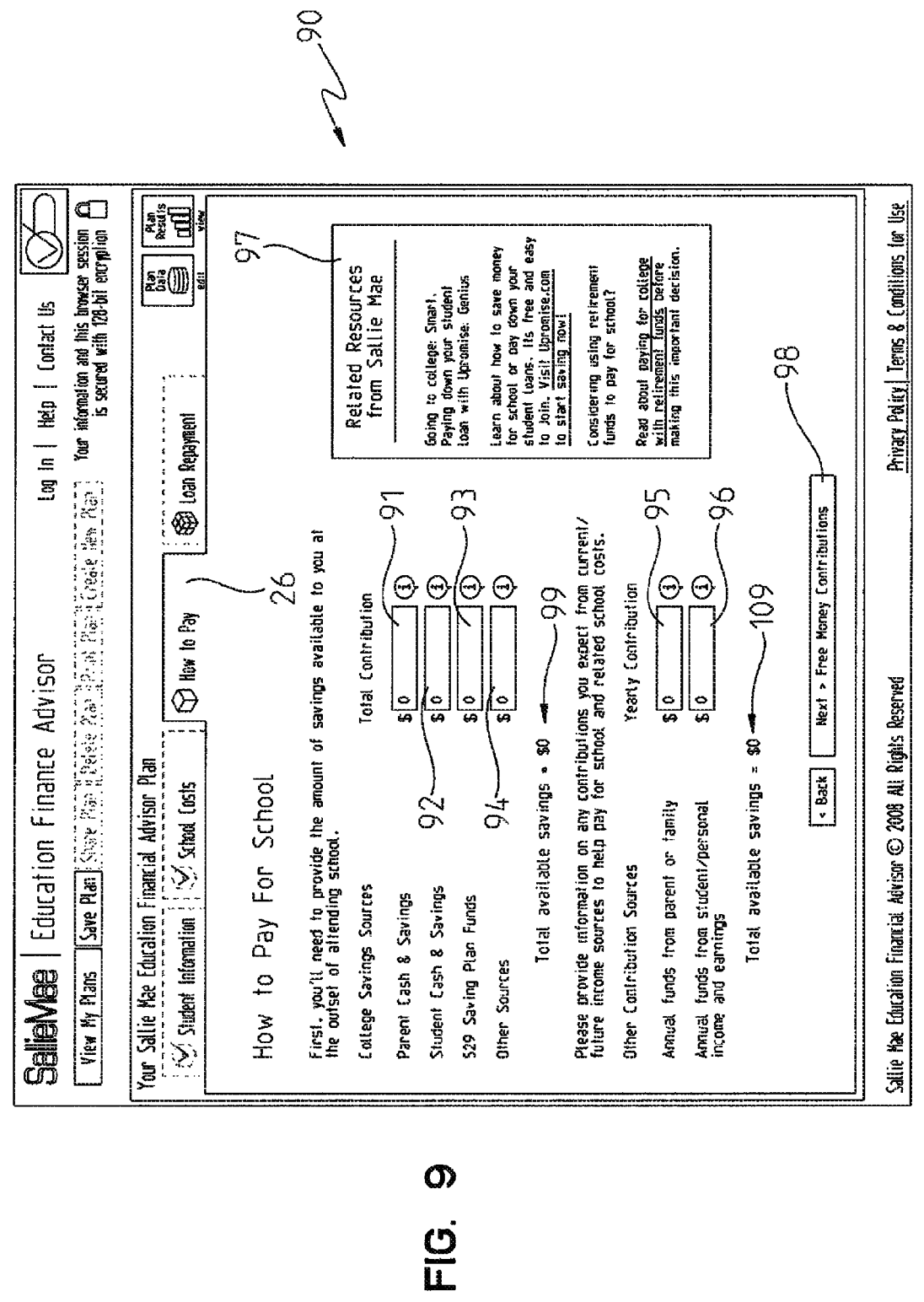

Selection of button 88 takes the user to webpage 90 of how to pay section 26, shown in FIG. 9. Webpage 90 provides locations to input each of Parent Cash & Savings 91, Student Cash & Savings 92, 529 Saving Plan Funds 93, and Other sources 94. Webpage 90 further provides total 99 for all the entered savings amounts. Webpage 90 also includes locations 95, 96 to input expected current and future income sources that can be used to pay educational expenses including funds from parents/family 95 and those from the student 96. Webpage 90 provides total 109 for all income sources. Along the right side of webpage 90 a description of a suggested savings vehicle 97 or otherwise is provided. Once fields 91-96 are completed, the user selects button 98 to continue.

Selection of button 98 takes the user to webpage 100 of FIG. 10. Webpage 100 provides locations 101-104 to input various scholarships and grants (state, school, other, and Federal) that will go towards educational expenses. Webpage 12 provides sum 105 of grants 101-104 and also provides link 106 to allow the user to search for grants. Once ready, the user selects button 108 to continue.

Figure 11:
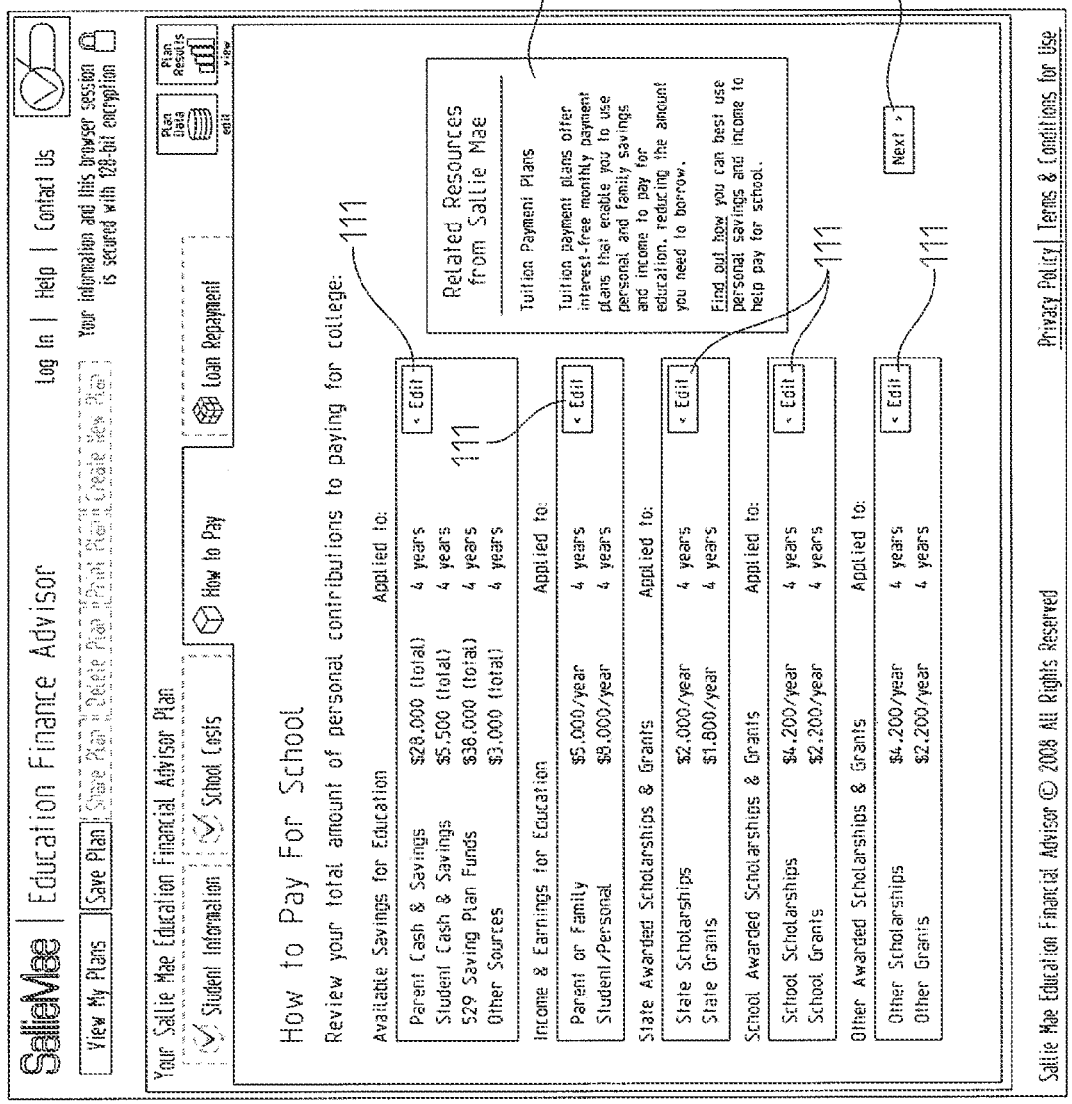
FIG. 11 shows a page of the system of FIG. 1 where a summary is presented of the values entered in the pages of FIGS. 9 & 10.

Selection of button 108 takes the user to webpage 110 of FIG. 11. Webpage 110 provides a summary of the previously entered funding sources. The user is able to edit any desired funding source through use of buttons 111 which when activated returns the user to web page 100. The user is able to scroll down the page to view a total contribution (not shown) and a button (not shown) that allows the user to continue in the system. The right side of page 110 provides a description and link 112 for a college payment program for which the user may choose to obtain more information.

Figure 12:
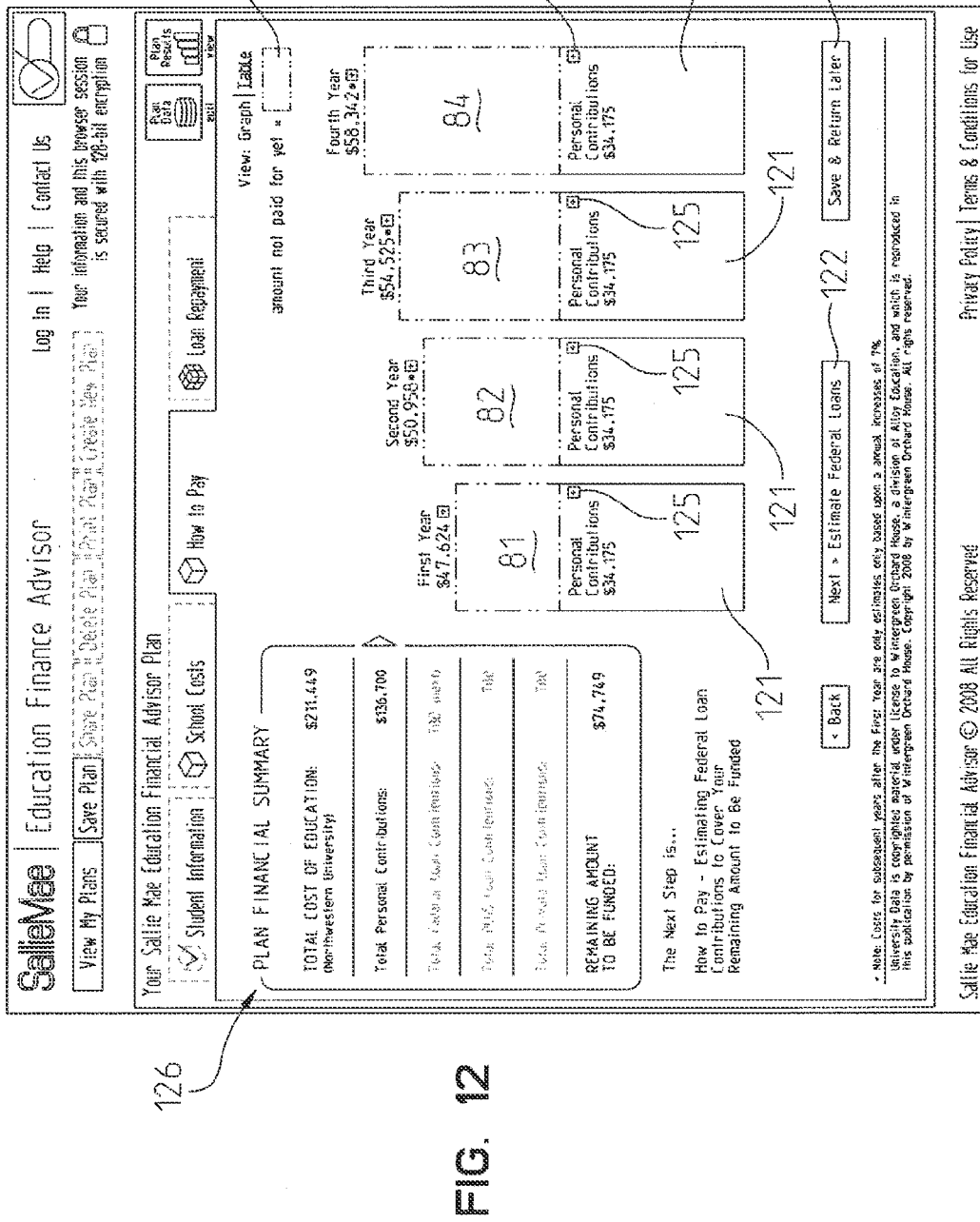
FIG. 12 shows a page of the system of FIG. 1 where the funding amounts summarized in FIG. 11 are graphically applied to the costs shown in FIG. 8.
Figure 15:
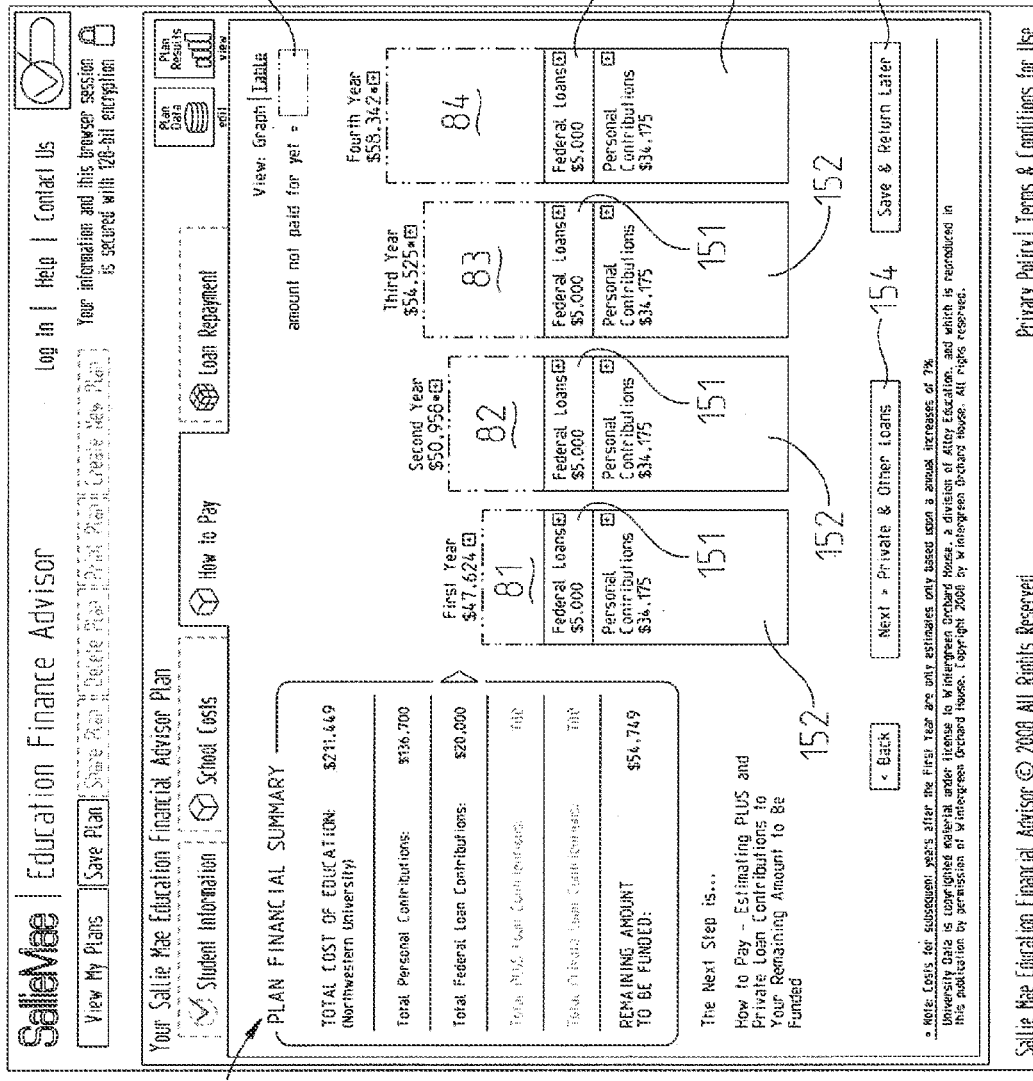
FIG. 15 shows a page of the system of FIG. 1 where Federal Loans of FIG. 14 are graphically applied to the costs and other funding sources of FIG. 12.
Figure 16:
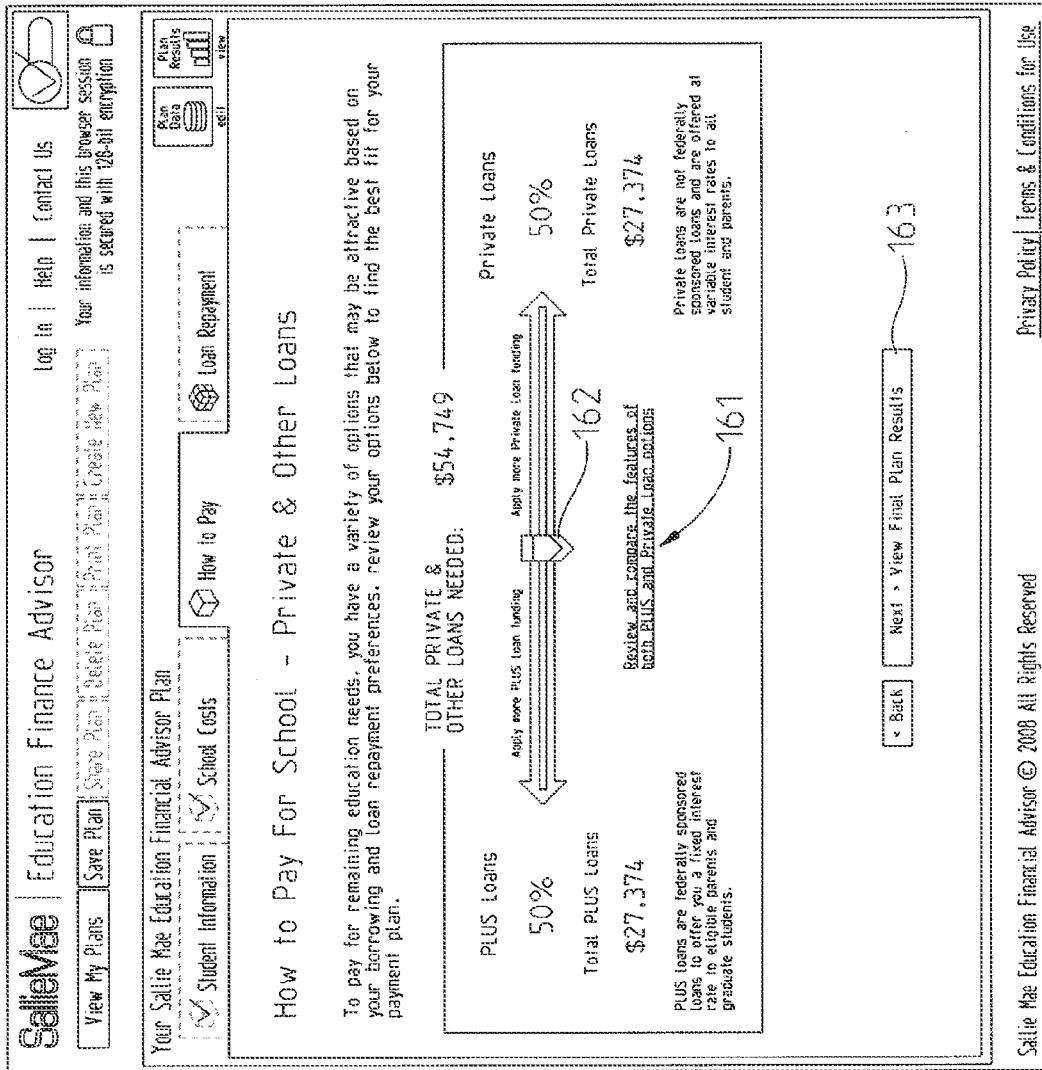
FIG. 16 shows a page of the system of FIG. 1 where a user may choose funding sources for any costs not met by previously identified funding sources.

Selection of the continuation button 114 takes the user to webpage 120 of FIG. 12. Webpage 120 is similar to webpage 80. Webpage 120 further includes an overlay of bars 121 indicating the personal contributions for each educational year in relation to the costs (bars 81, 82, 83, 84) associated with that year. The overlay gives the user a graphical representation of the amount of the costs that will be taken care of through personal contributions and grants. The overlay also shows the amount of the costs that still must have a funding source located which is still shown in color/pattern 86. Bars 121 also include text that indicate the dollar amount represented by bars 121. Beside each text dollar amount is expansion icon 125. As with expansion icon 85, a mouse-over or clicking of expansion icon 125 provides a pop up bubble or window that shows the dollar amounts and sources that are being combined to arrive at the amount shown. Similarly to the updated bars, the Financial summary 126 is updated to include the newly added personal contributions. Toward the upper right corner, the user can chose to view the cost and source values as a table rather than as a graph, although such a display is not shown. Again, webpage 120 provides button 122 to continue and button 123 to save and return later.

Figure 13:
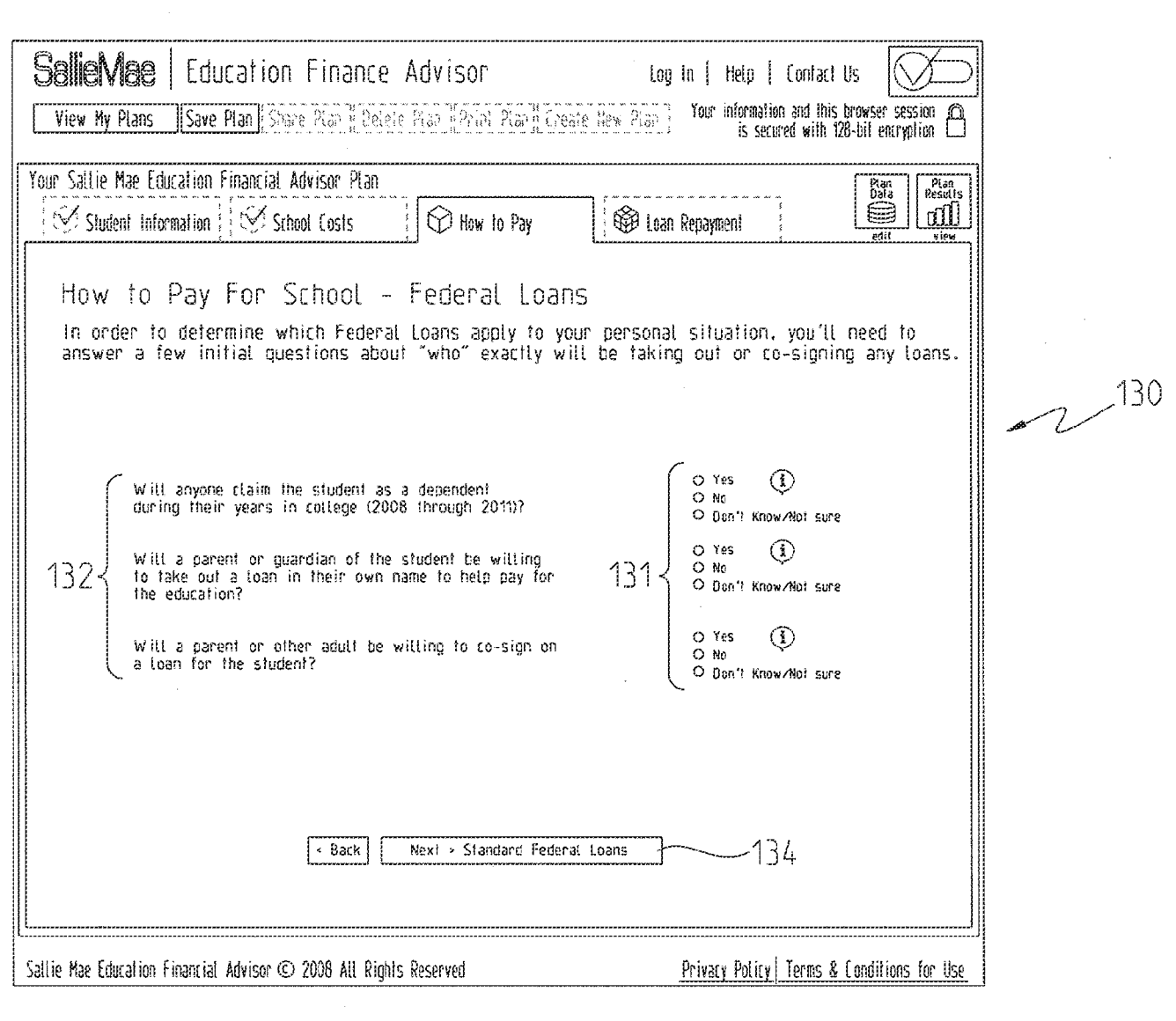

Selecting button 122 takes the user to webpage 130 shown in FIG. 13 that begins the process of estimating available Federal Loans. Webpage 130 asks three questions 132, "Will anyone claim the student as a dependent during their years in college?," "Will a parent or guardian of the student be willing to take out a loan in their own name to help pay for the education?," and "Will a parent or other adult be willing to co-sign on a loan for the student?" Radio buttons 131 are provided for answering the three questions. Once the questions are answered, the user selects button 134 to continue. It should be noted that an answer of "no" to either the second or third question will result in later questions regarding the parents to be omitted.

Figure 14:
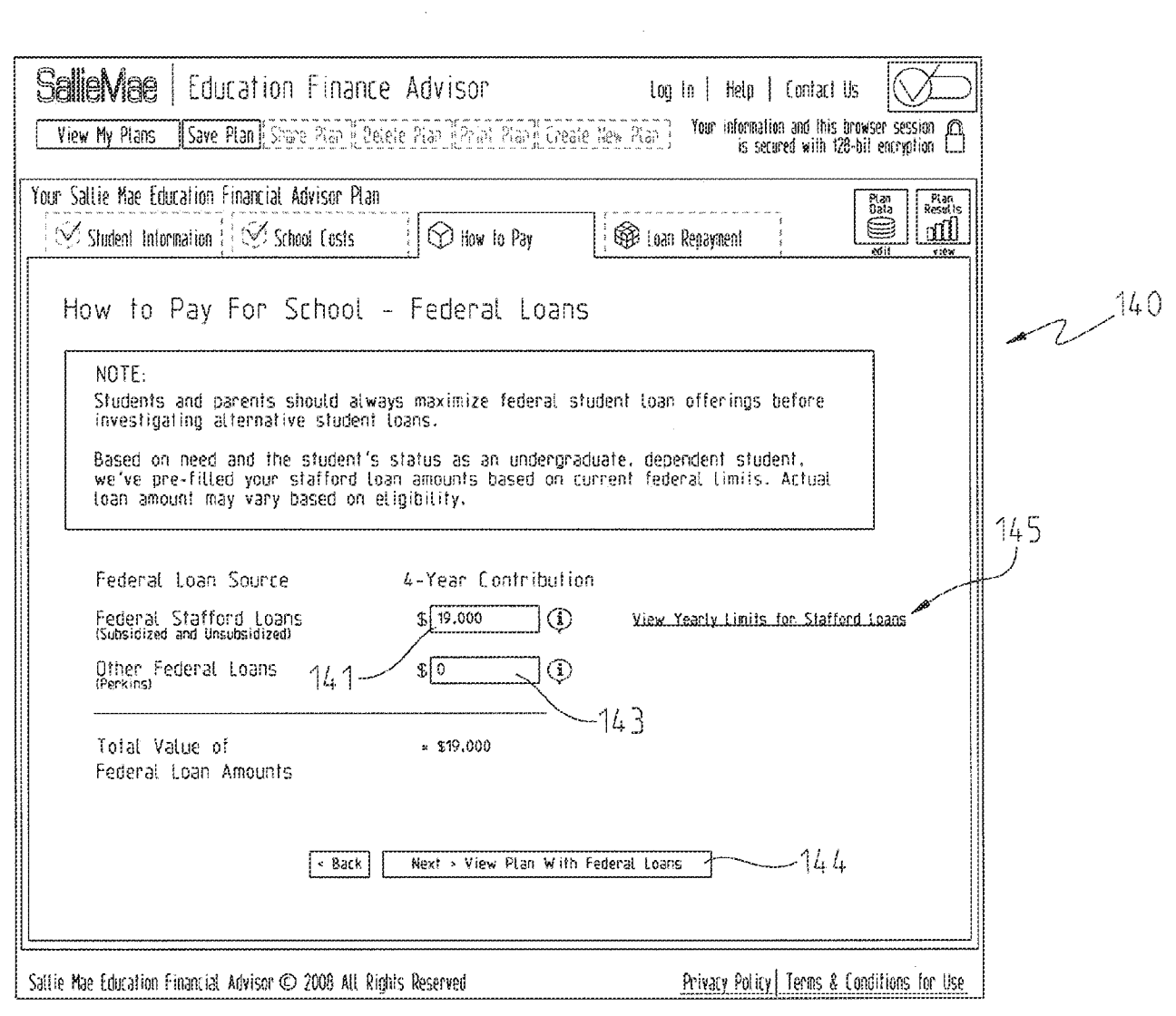

Selection of button 134 takes the user to webpage 140 shown in FIG. 14. Webpage 140 allows for input of an expected amount of Stafford and other federal loans. Link 145 directs the user to the eligibility limitations for Stafford Loans. The amount of need-based student federal loans an average student at the chosen institution receives is pre-populated by type into the appropriate fields: Stafford Loans 141 and other Federal Loans 143. Furthermore, the system has a link with the loan eligibility service, and assesses the link providing the school and program the user intends to attend. The loan eligibility service responds with those loans the user is eligible for, a suggested priority of the loan, and the limits of the loans. Federal Stafford Loan limits are dependent upon the class year of the student, the dependent/independent status of the student, and whether the student is in undergrad or a graduate program. The user may change the pre-populated values to reflect a desire to take less than the full allowed amount. Again, button 144 is selected to continue with the process.

Button 144 takes the user back to bar graph webpage 150, that is similar in configuration to webpages 80, 120. The contribution of the Federal loans derived from webpage 140 is graphically added as bars 151 into cost bars 81, 82, 83, 84 to further "fill" them up, resulting in less "unfunded" area shown in color/pattern 86. The Federal loan contributions 151 are shown on top of the personal contributions 152. Similarly, Summary 155 is updated to reflect the Federal Loan contribution. Button 154 is provided to continue with the process, with button 156 being provided to allow for saving the current data.

Selection of button 154 takes the user to webpage 160. Webpage 160 presents the user with options regarding PLUS loans and private loans. Webpage 160 provides link 161 to information regarding these options. Webpage 160 also provides slider 162 that allows the user to customize the allocation of the remaining need ("cost"–"personal contribution"–"Federal Loans"=remaining need) between PLUS loans and private loans. Once chosen, button 163 is selected to continue with the process. If PLUS loans are not available, the user is presented with a slider that only allows private loans to be chosen.

Figure 17:
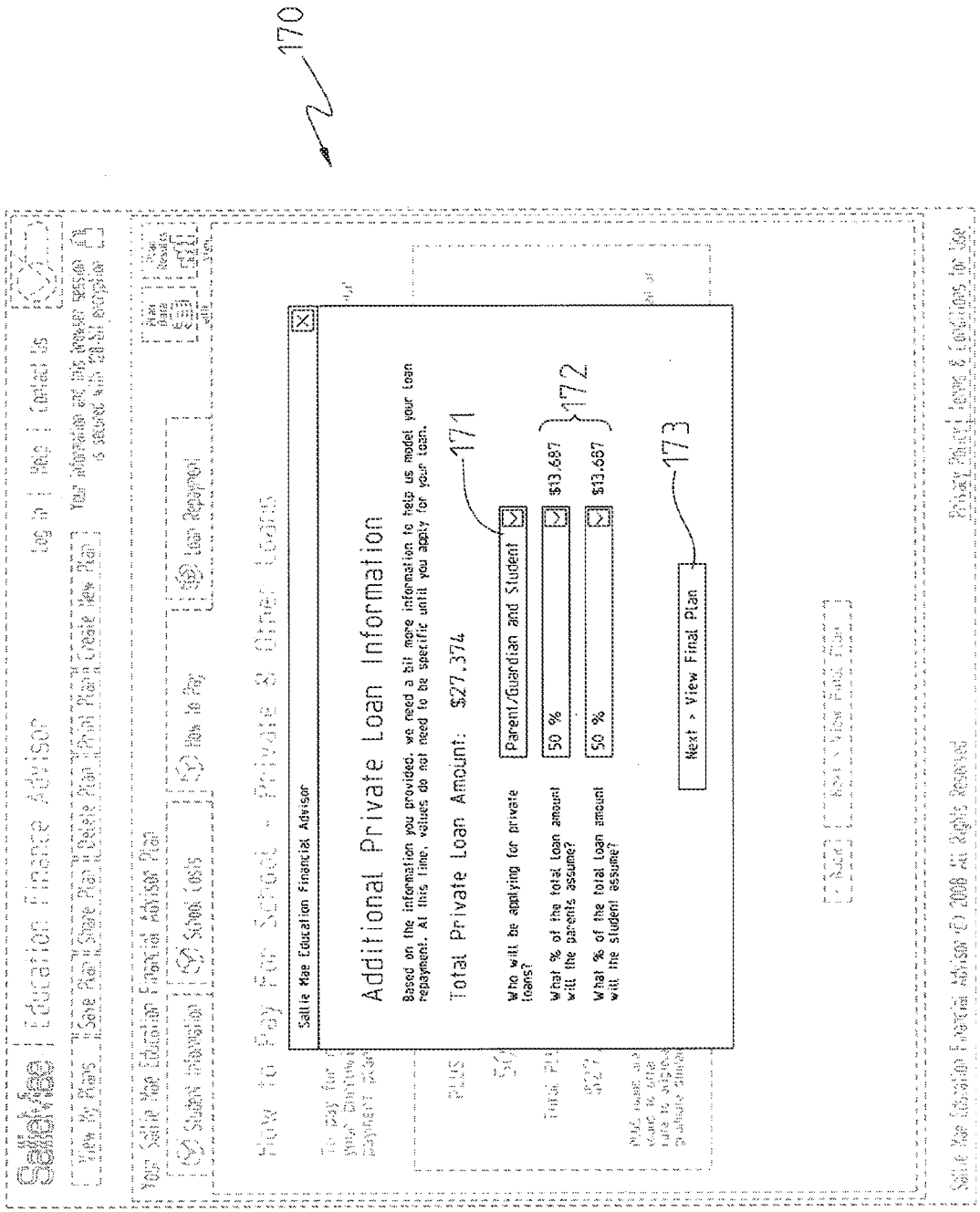
FIG. 17 shows a pop-up window of the system of FIG. 1 where information regarding a private loan is entered.

If some private loans are selected, pop-up window 170 appears as shown in FIG. 17. Window 170 asks who is applying for the loans at 171; parents, student, or both. Window 170 further inquires as to the debt assumption percentages for each applying party at 172. Once entered, button 173 is selected to continue with the private loan process.

Selection of button 173 takes the user to bar graph webpage 180 that is similar in configuration to webpages 80, 120, 150. The contributions of the PLUS loans (if included) and private loans derived from webpage 160 is graphically added as bars 181, 182 into cost bars 81, 82, 83, 84 to further "fill" them up resulting in no area remaining having the "unfunded" color/pattern 86. The PLUS loan and private loan contributions 181, 182 are shown on top of the personal contributions 152 and Federal loans 151. Similarly, summary 175 is updated to reflect the PLUS loan and private loan contributions.

At this point, although it could have come at a previous point, the educational costs 81, 82, 83, 84 are fully funded. Webpage 180 notes that "Your plan is complete! You have 3 options for what you can do with your plan:" Three buttons 183, 184, 185 are presented; Share Plan With Others 183, Save Your Plan 184, Print Your Plan 185. Furthermore, button 186 is provided that invites the user to learn about or apply for loans. Additionally, the summary on the left provides total estimated student monthly payments 187, total estimated parent monthly payments 188, estimated total monthly loan payments 189, and button 191 that provides for reviewing of loan repayment details. Additionally, it should be noted that each of upper navigation buttons 41-46 are now in full color as opposed to some being faded previously to indicate that they were not available to be chosen.

Upper navigation buttons 41-46 allow the user to select options for the user. Button 41 is titled "View My Plans" and takes a user to the webpages that have been heretofore discussed. Button 42 is titled "Save Plan" and allows the user to save his/her progress. Button 42 performs the same function as various save buttons that have been shown in the previously described webpages. Button 43 is titled "Share Plan" and upon selection, takes the user to webpage 270, FIG. 27A, discussed further below, that allows the user to share the created plan with others. Button 44 is titled "Delete Plan" and upon selection removes the currently accessed completed plan or any work performed toward creating the currently accessed plan. Button 45 is titled "Print Plan" and upon selection, sends instructions to a printer to create a hardcopy of the currently accessed plan. Button 46 is titled "Create New Plan" and upon selection takes the user to webpage 30 or other desired starting point.

Figure 19A:
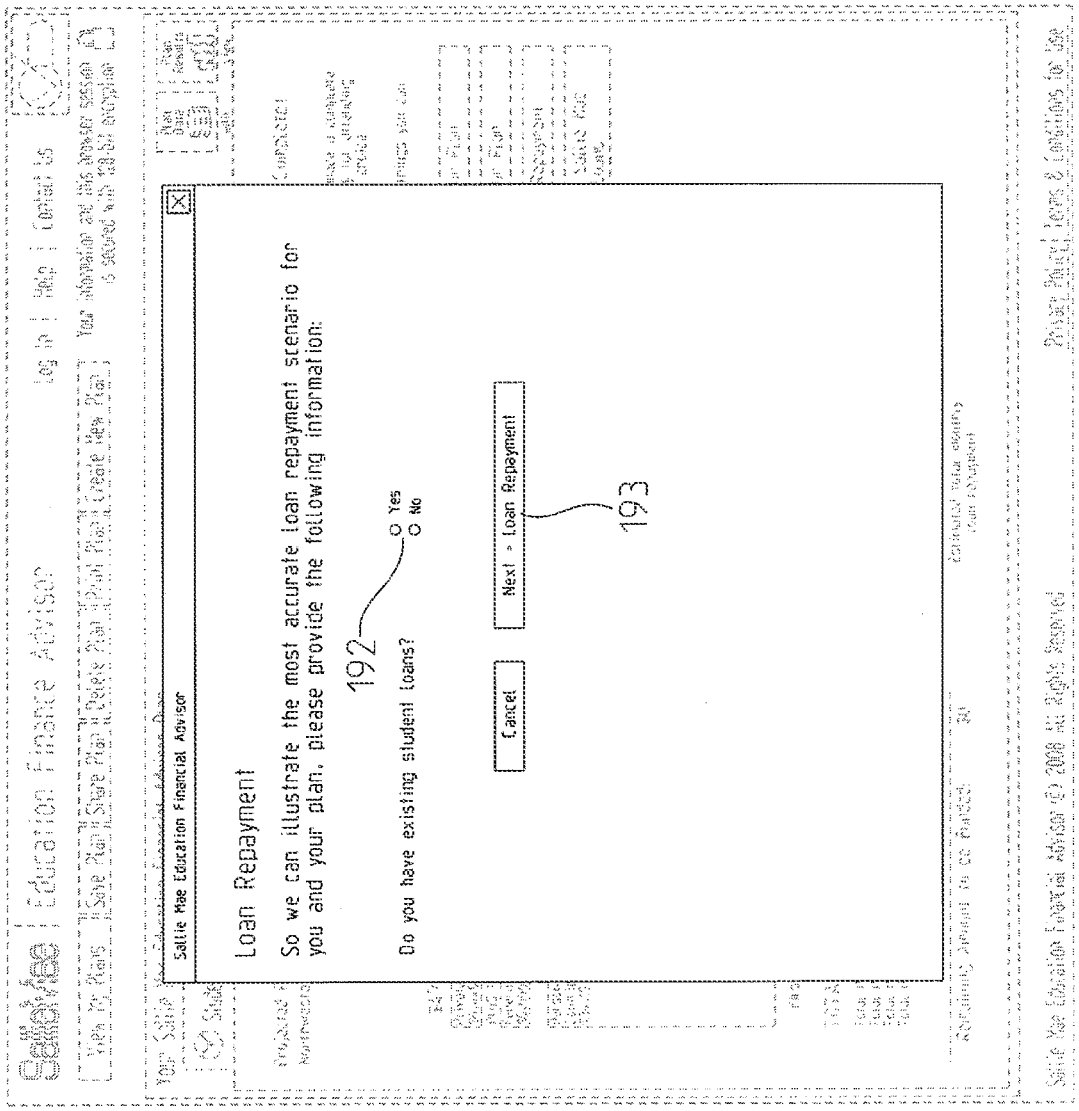
FIGS. 19A&B show a pop-up window of the system of FIG. 1 where information regarding existing student loans is entered.
Figure 19B:
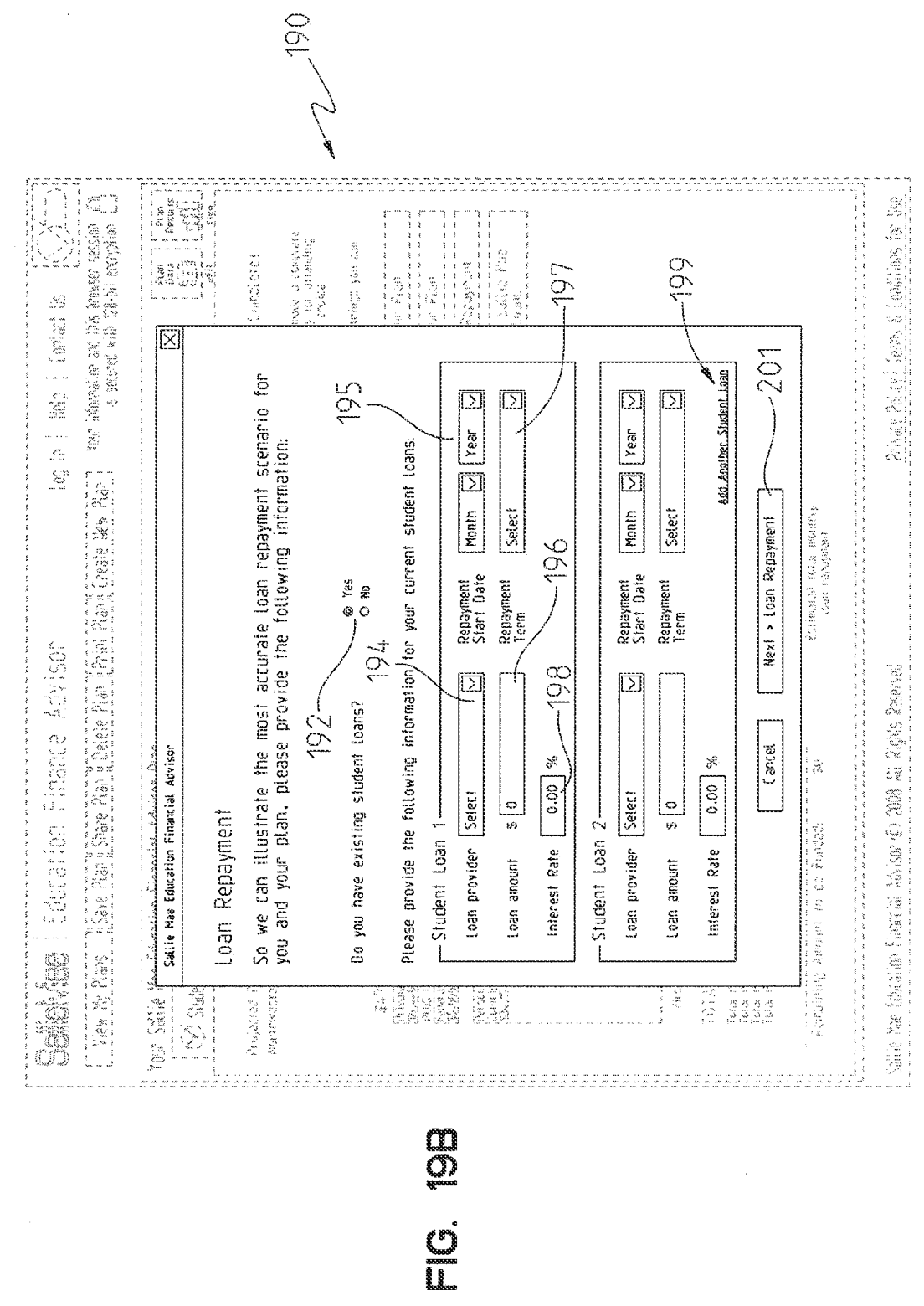

Selection of prepayment button 191 brings up window 190, FIG. 19A, that asks "Do you have existing student loans?" The user answers the question using radio buttons 192 and selects button 193 to continue. If "Yes" is selected, window 190 expands as shown in FIG. 19B. The user is then asked to input information regarding the existing student loans including provider 194, repayment start date 195, loan amount 196, repayment term 197, and interest rate 198. Spaces are provided to input information regarding two existing loans. Furthermore, link 199 is provided to add additional existing loan information. Once completed, the user selects button 201 to continue.

Figure 20:
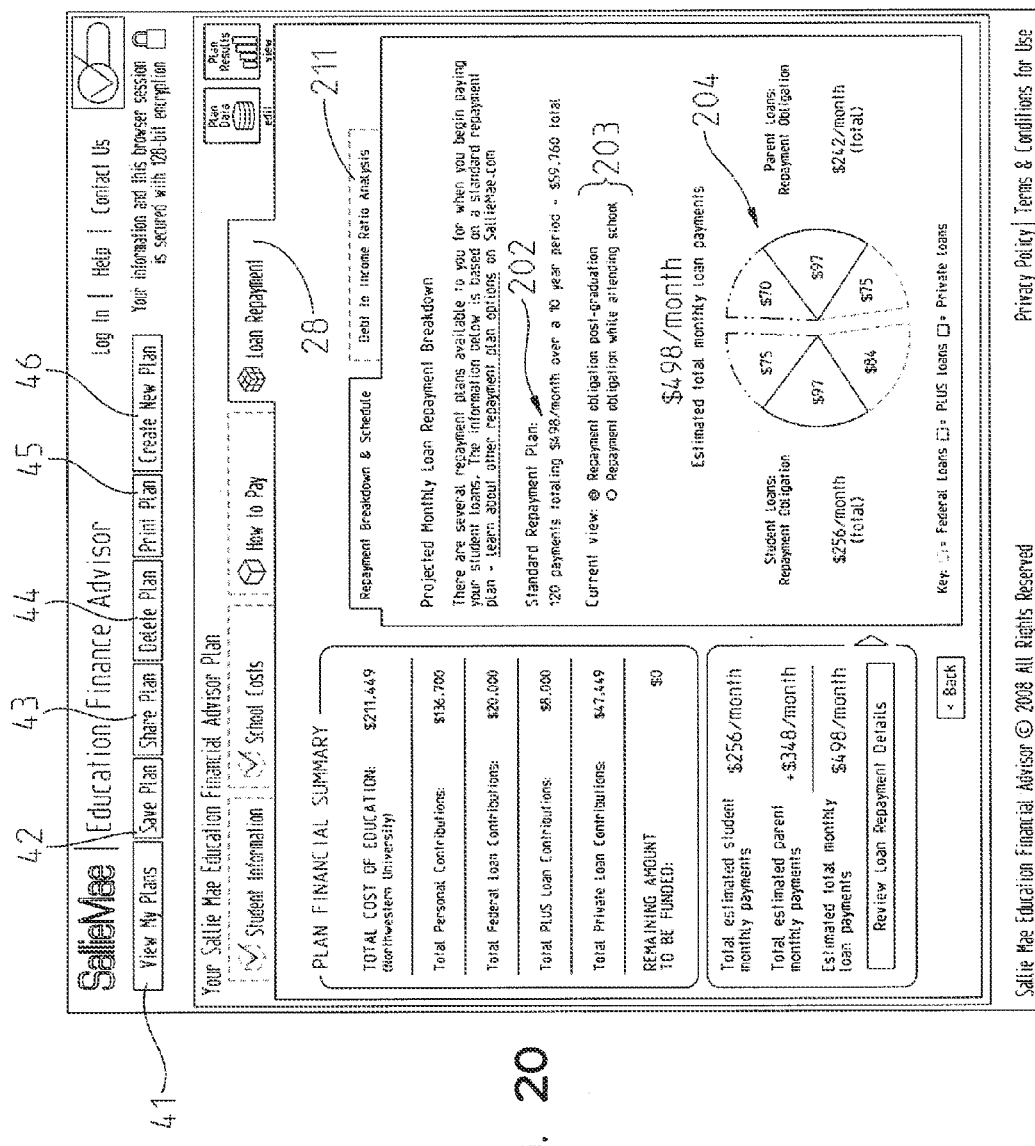
FIG. 20 shows a page of the system of FIG. 1 where a loan repayment calculation is presented based upon the previously identified funding sources.

Selection of button 201 takes the user to webpage 200 (FIG. 20) that is part of Loan Repayment section 28. Similarly, selection of button 193 with "No" selected in radio buttons 192 also takes user to webpage 200. Example webpage 200 results from indicating no previously existing student loans. Webpage 200 indicates that a standard repayment plan is being used at 202. The user may choose between views of repayment post-graduation or repayment while attending school at 203. Pie graph 204 separates the debt between the student and parents and also differentiates the amounts being paid for each of the component loans. Webpage 200 further includes a button (not shown) to progress to webpage 210.

Figure 18:
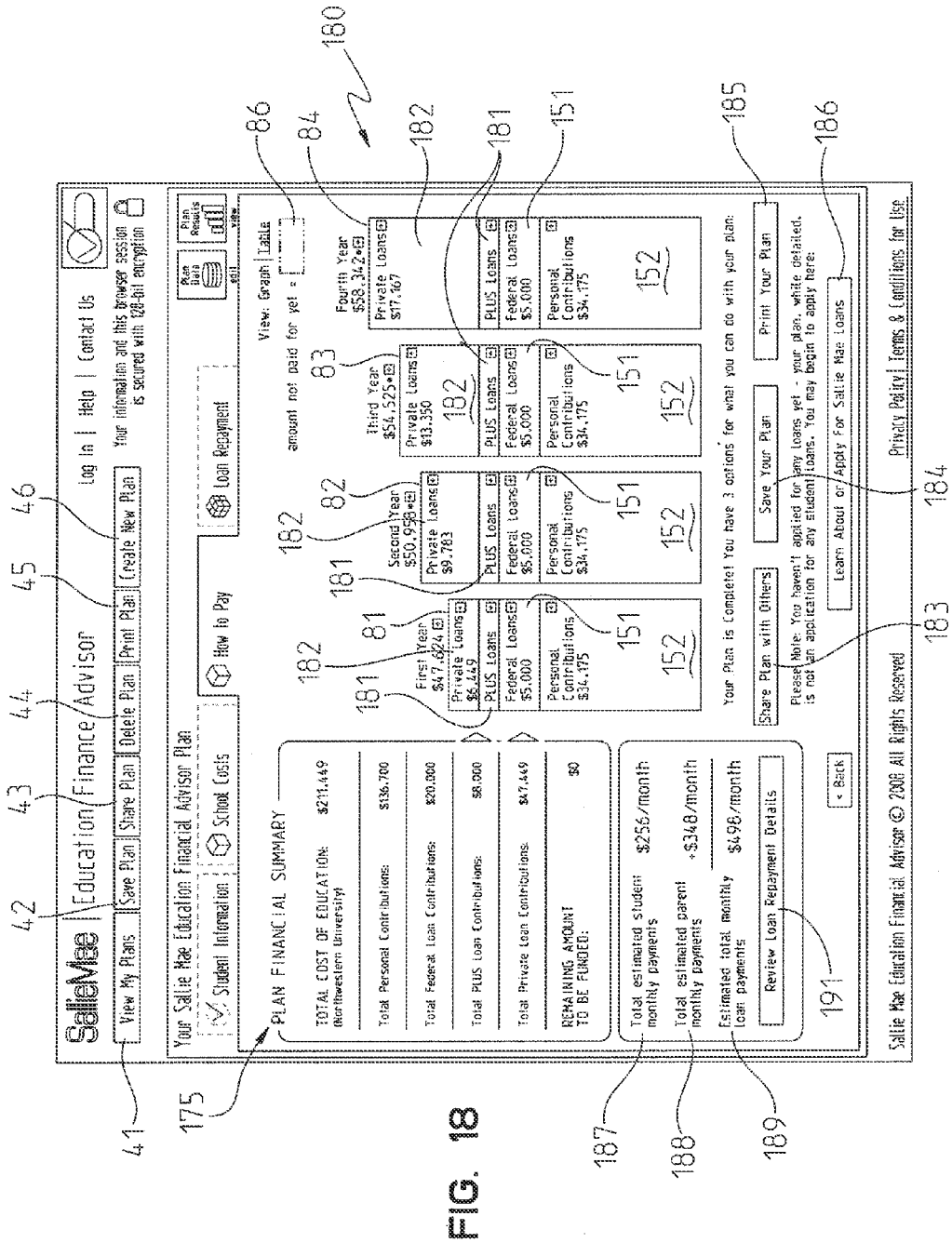
FIG. 18 shows a page of the system of FIG. 1 where the funding sources identified in FIG. 16 are graphically applied to the costs and other funding sources of FIG. 15.
Figure 21:
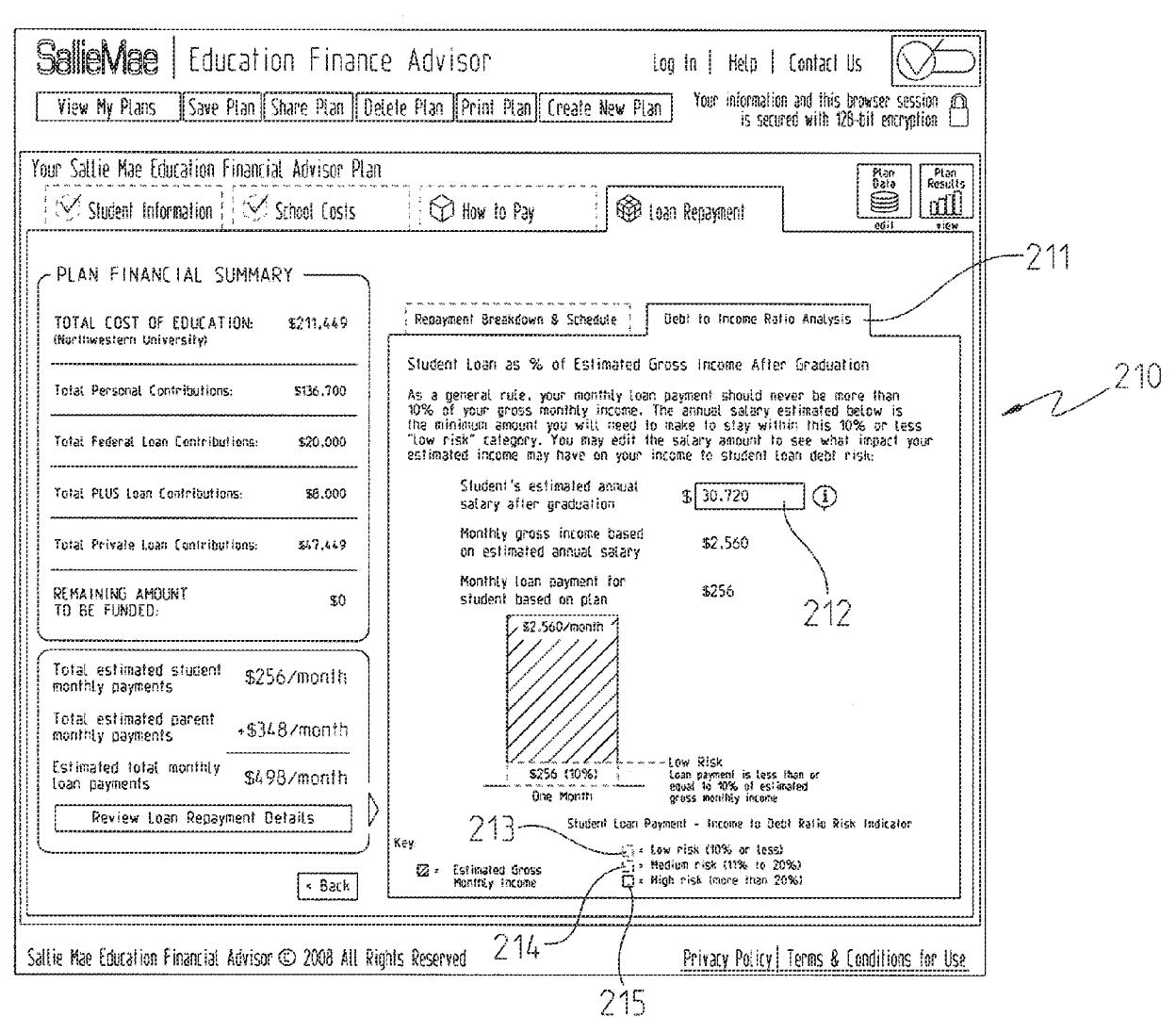
Figure 22:
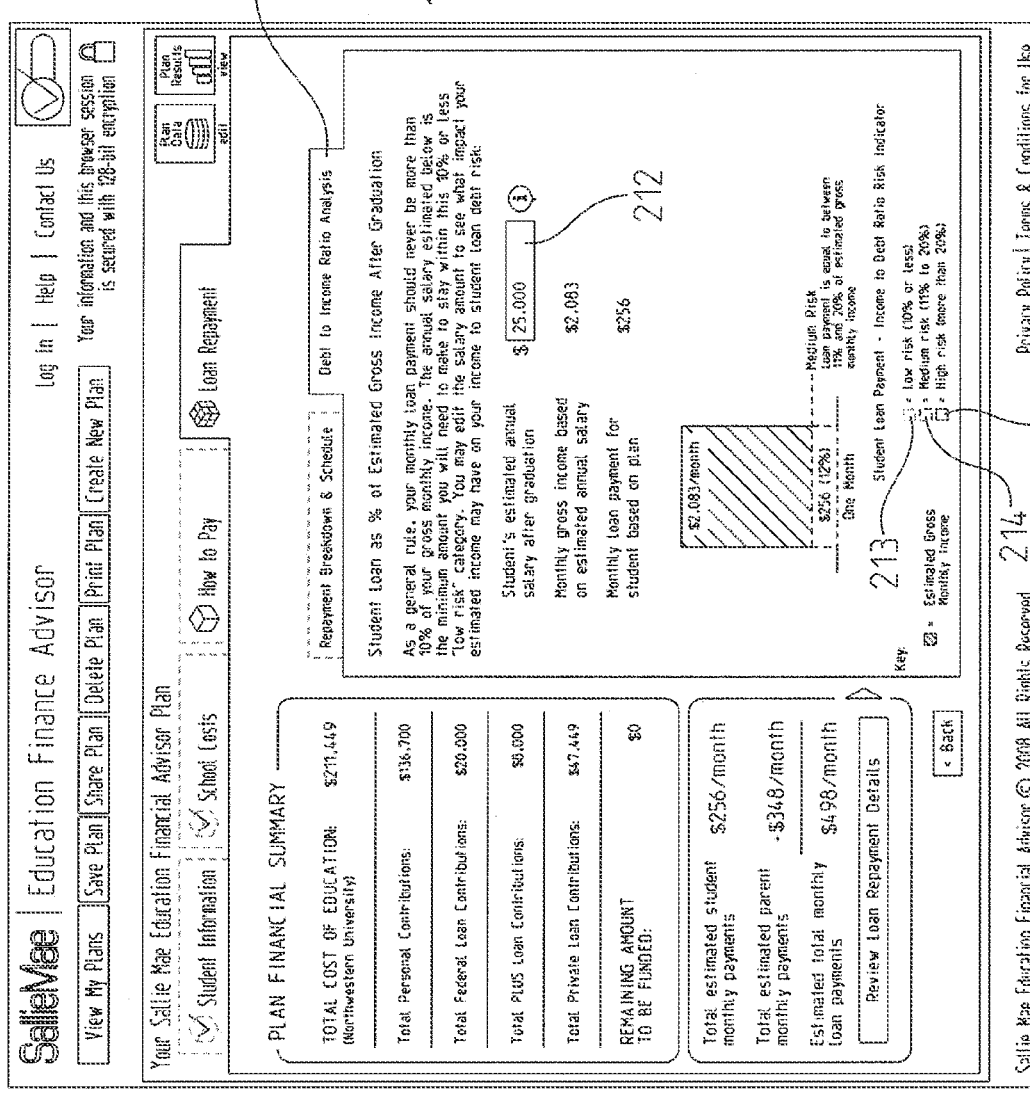
FIG. 22 shows a page of the system of FIG. 1 where the loan repayment calculation of FIG. 20 is compared with an expected income of the student that results in a determination of medium risk.
Figure 23:
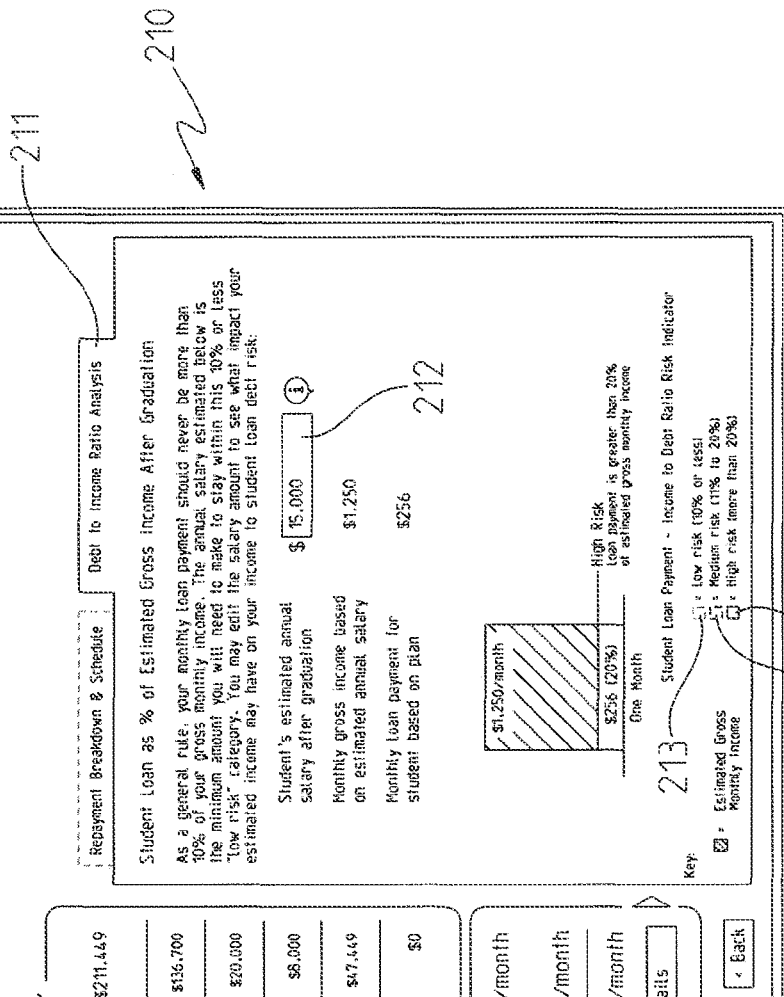
FIG. 23 shows a page of the system of FIG. 1 where the loan repayment calculation of FIG. 20 is compared with an expected income of the student that results in a determination of high risk.

Webpage 210, FIG. 21, is "Debt to Income Ratio Analysis" tab 211 that is partially visible on webpage 200. Webpage 210 begins to present the user with context in which to consider the amount of debt that the student is taking on in relation to their ability to repay the debt. To this end, the previously estimated monthly loan payment is compared to an expected job salary. The student's estimated annual salary after graduation is entered into box 212. In one embodiment, box 212 may be pre-populated with a value that is correlated to the area of study entered on webpage 50, or alternatively may be populated by the user. Additional information such as the school attended may also be factored into the pre-populated estimate value in box 212. A pre-populated value in box 212 may be fixed or may be present as a suggestion that is changeable by the user. Webpage 210 takes the value in box 212 and divides by 12 to arrive at a monthly gross income. This monthly gross income is then compared to the previously determined estimate of loan payments. Once the comparison is performed, the student is classified for the risk level associated with the debt level, for example, either being high risk, medium risk, or low risk of defaulting or otherwise encountering difficulty repaying the loan. A student with loan payments that are less than 10% of the monthly gross income is classified as low risk 213 (FIG. 21). A student with loan payments that are between 11% and 20% (or greater than 10% and less than 20%) of the monthly gross income is classified as medium risk 214 (FIG. 22). A student with loan payments that are greater than 20% of the monthly gross income is classified as high risk 215 (FIG. 23). Although not shown, scrolling down on webpage 210 reveals buttons 183, 184, 185 shown in FIG. 18.

Figure 24:
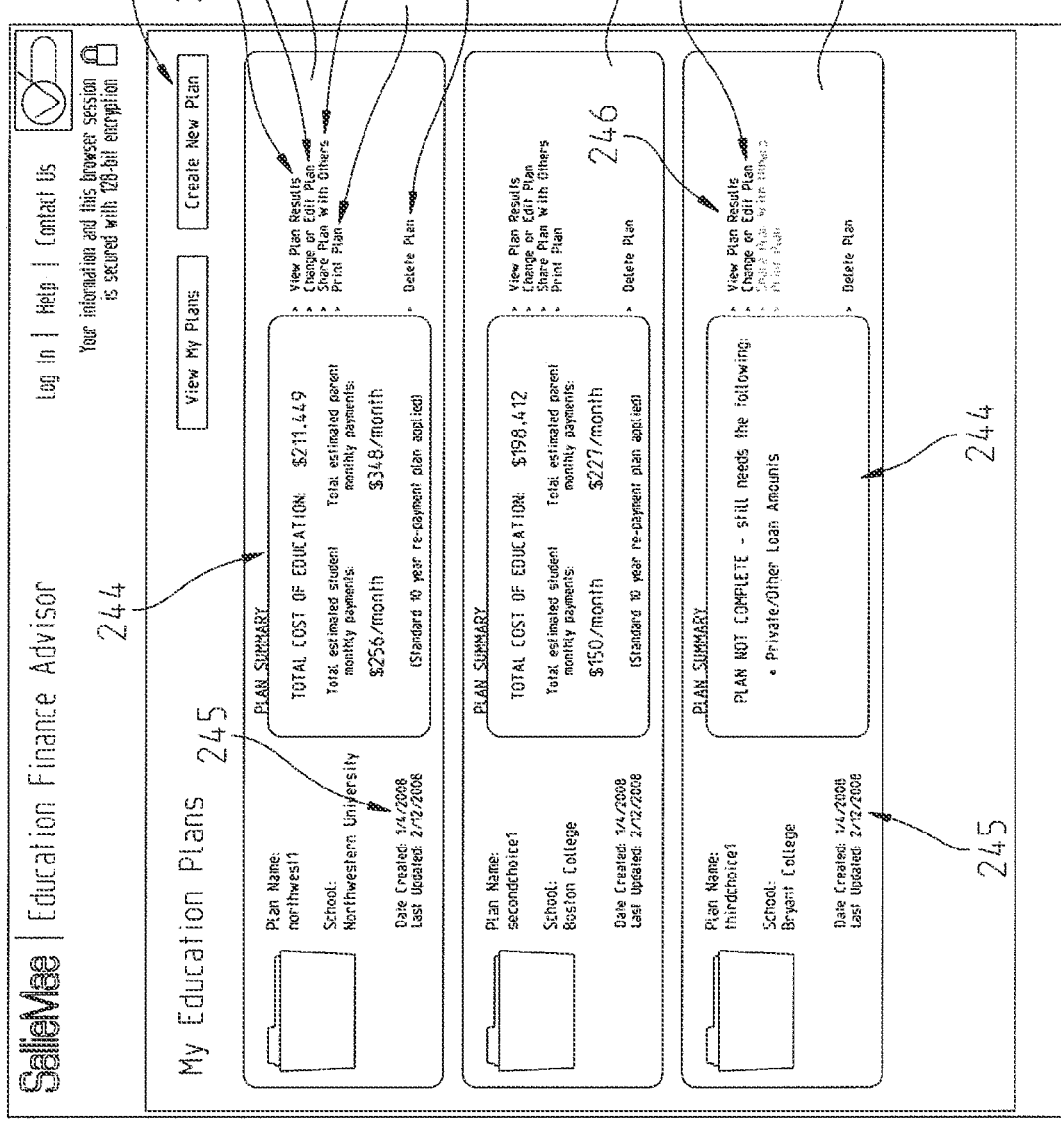
FIG. 24 shows a page of the system of FIG. 1 where summaries of multiple educational funding plans can be viewed and selected.

Selection of "View My Plans" button 41 at any point takes the user to webpage 240, FIG. 24. Webpage 240 displays all previously worked on plans 241, 242, 243 including completed plans 241, 242 and uncompleted plans 243. Completed plans 241, 242 are shown with a results summary 244 and information regarding plan creation and revision 245. Links are also provided that allow viewing of more detailed results 246, changing or editing the plan 247, sharing the plan with others 248, printing plan 249, and deleting plan 251. Uncompleted plans 243 likewise include summary 244 of needed information, information regarding plan creation and revision 245, and links to more detailed results 246, to changing or editing the plan 247, and for deleting plan 251. Links are not provided for sharing or printing unfinished plans 243 in that plans 243 are not completed.

Figure 25:
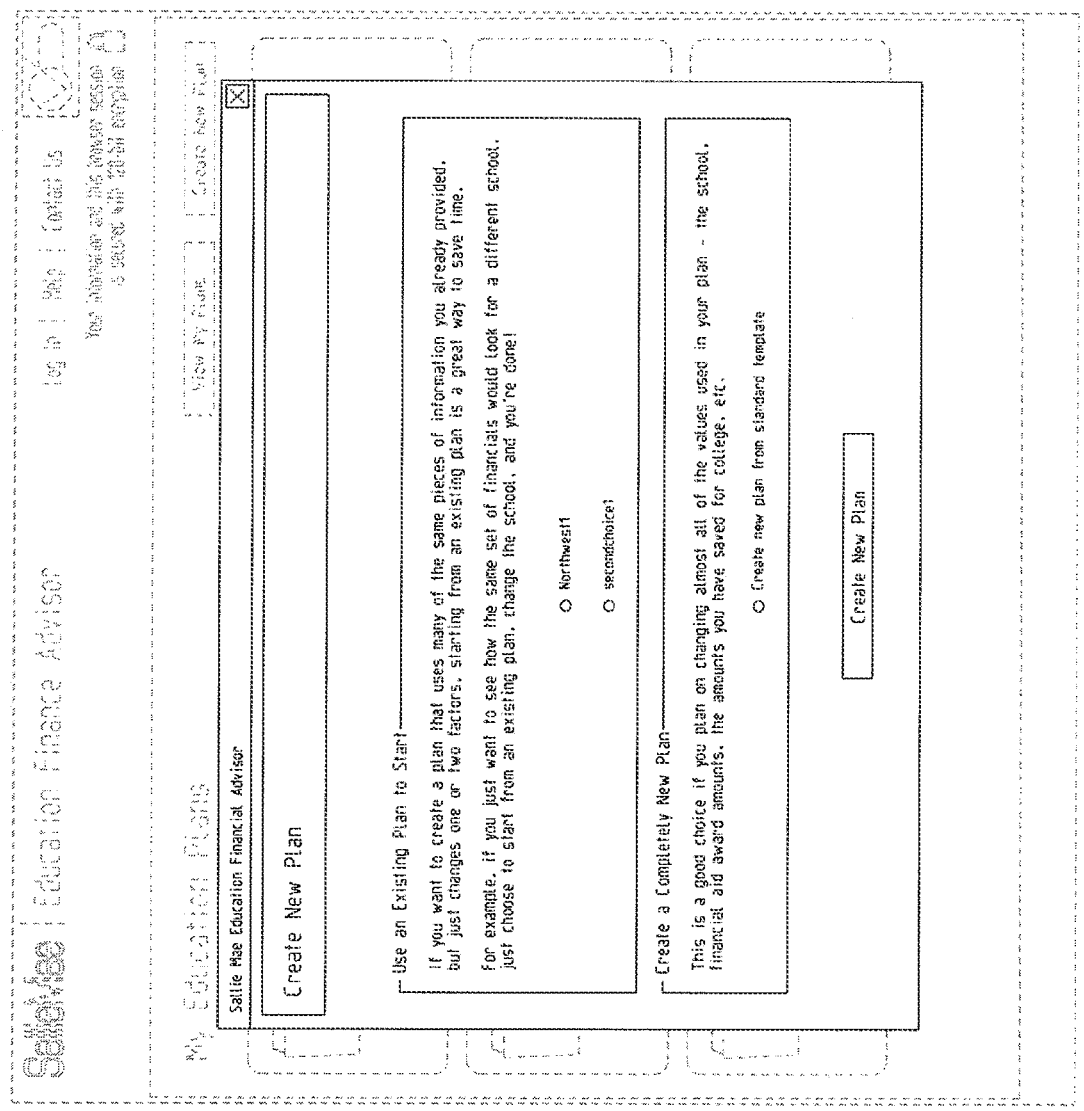
FIG. 25 shows a page of the system of FIG. 1 where the user is able to start a new educational financing plan.

Selection of button 46, button 252, or any other location of a "Create New Plan" button takes the user to pop-up window 250, FIG. 25. Window 250 provides the user with the option to use a previously created plan as a starting point for the new plan or to start from scratch. If the user chooses to start from a previously created plan, the user is taken to webpage 30, or another point in the process if desired, where the fields of webpage 30 are pre-populated with information provided during the creation of the plan chosen as the starting point. If the user chooses to start from scratch, the user is taken to webpage 30, or another point in the process if desired, without pre-populated fields.

Figure 26:
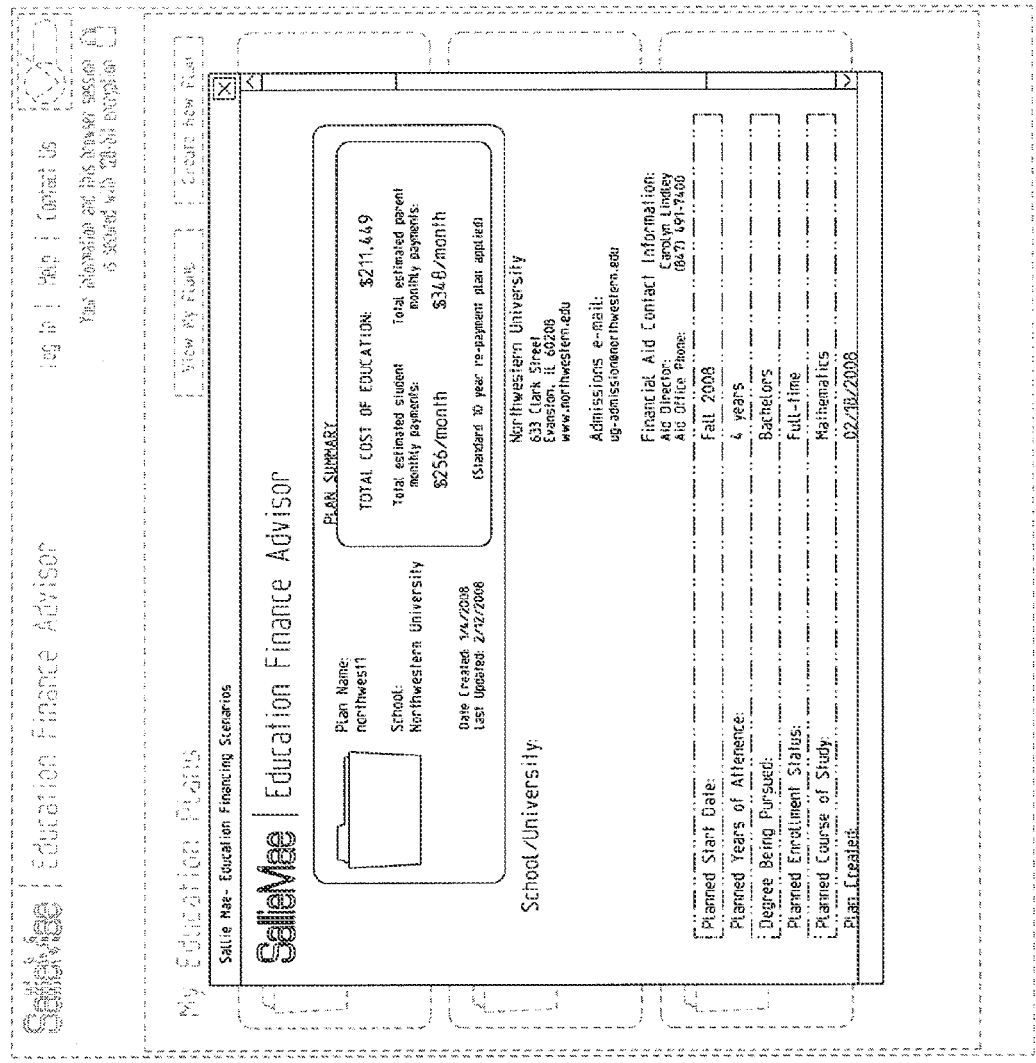
FIG. 26 shows a page of the system of FIG. 1 where a more detailed summary of an educational financing plan is displayed.

Selection of button 45, link 249, or any other "Print Plan" button or link takes the user to pop-up window 260, FIG. 26. Window 260 provides a report and a button (not shown) to send the report to a printer (not shown).

Figure 27A:
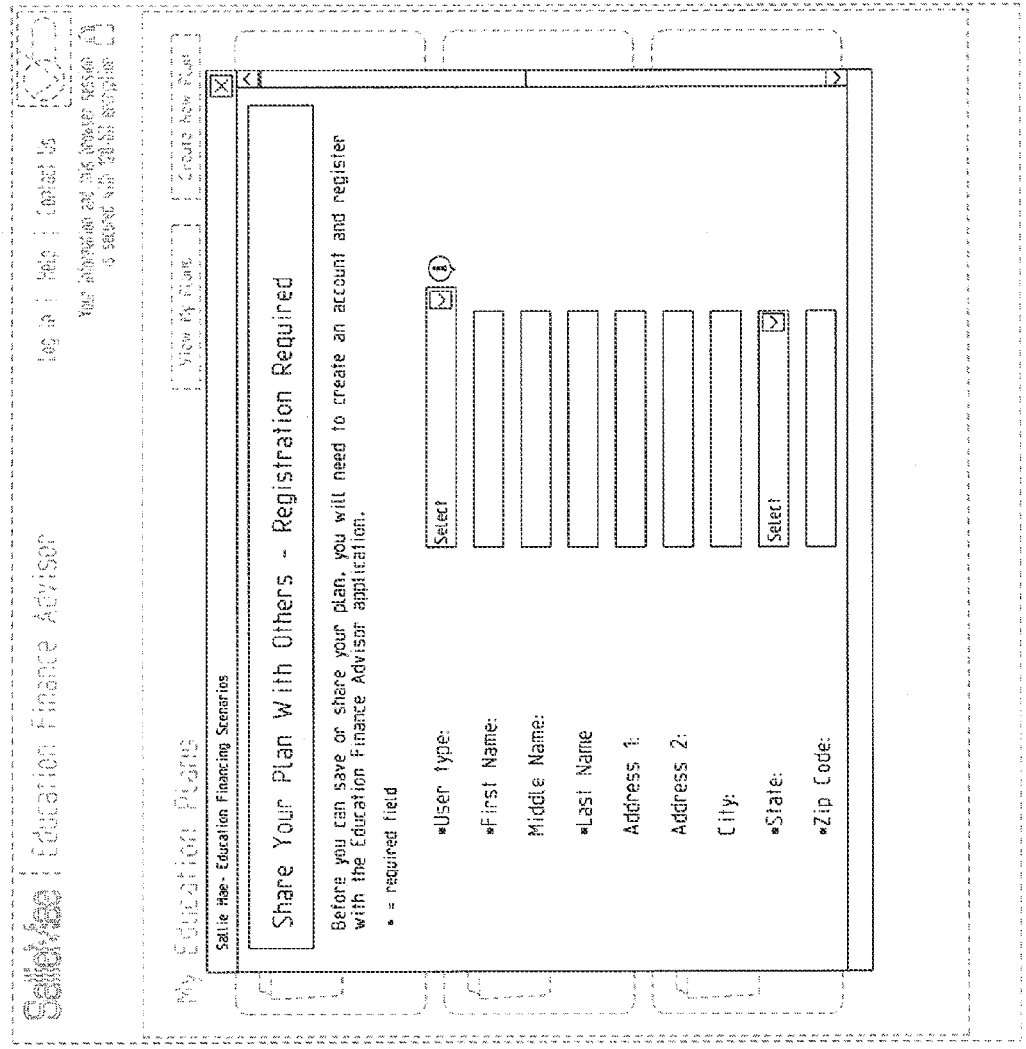
FIGS. 27 A&B show a pop-up window of the system of FIG. 1 where a user enters information for registering with the site.
Figure 27B:
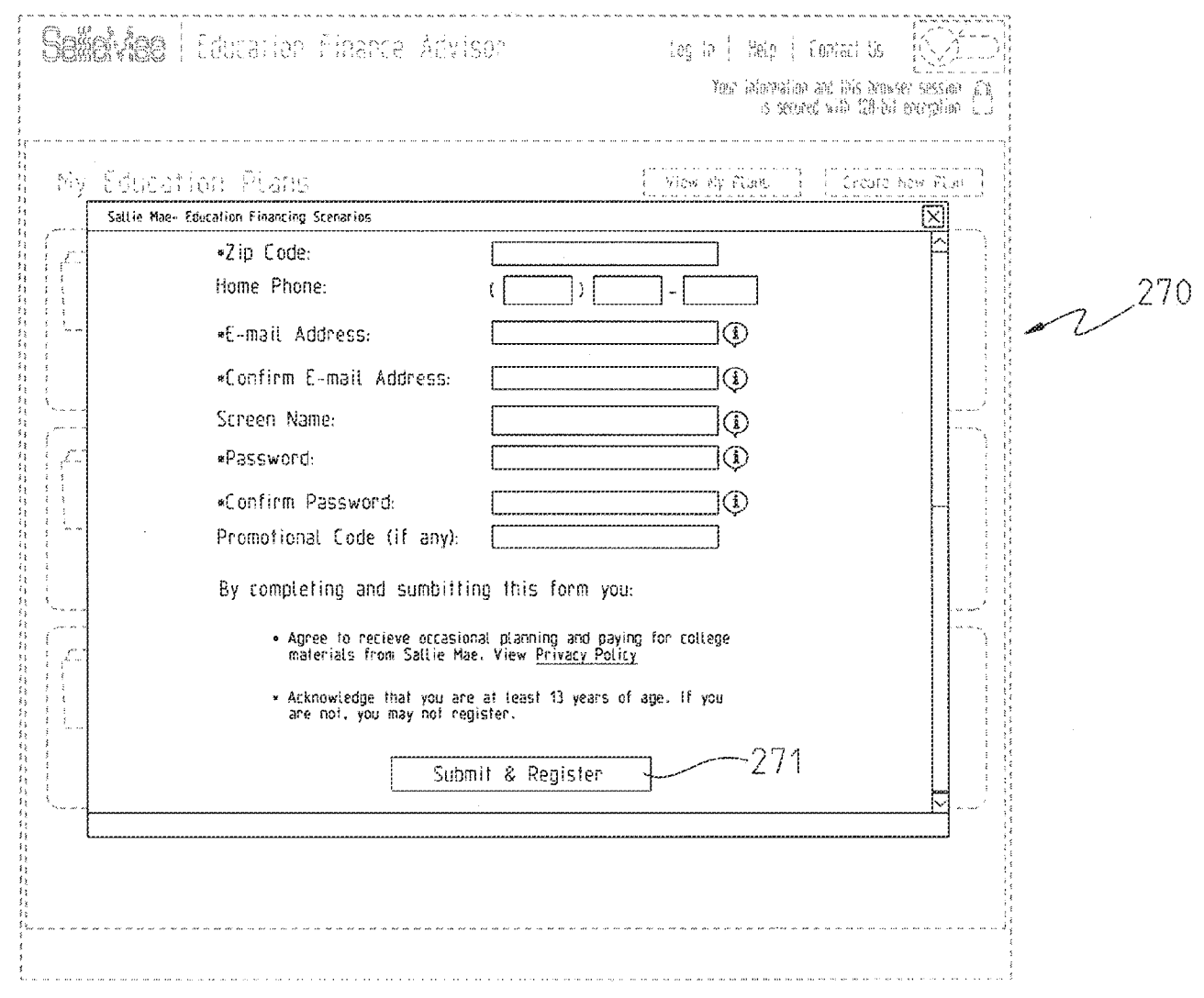

If the user has not logged in or does not have a log in, selection of button 43, link 248, or any other "Share Plan" button or link takes the user to pop-up window 270, FIGS. 27A&B. Window 270 provides registration for the user. A link for users who have already registered, but not logged in, is also provided (not shown).

Figure 28:
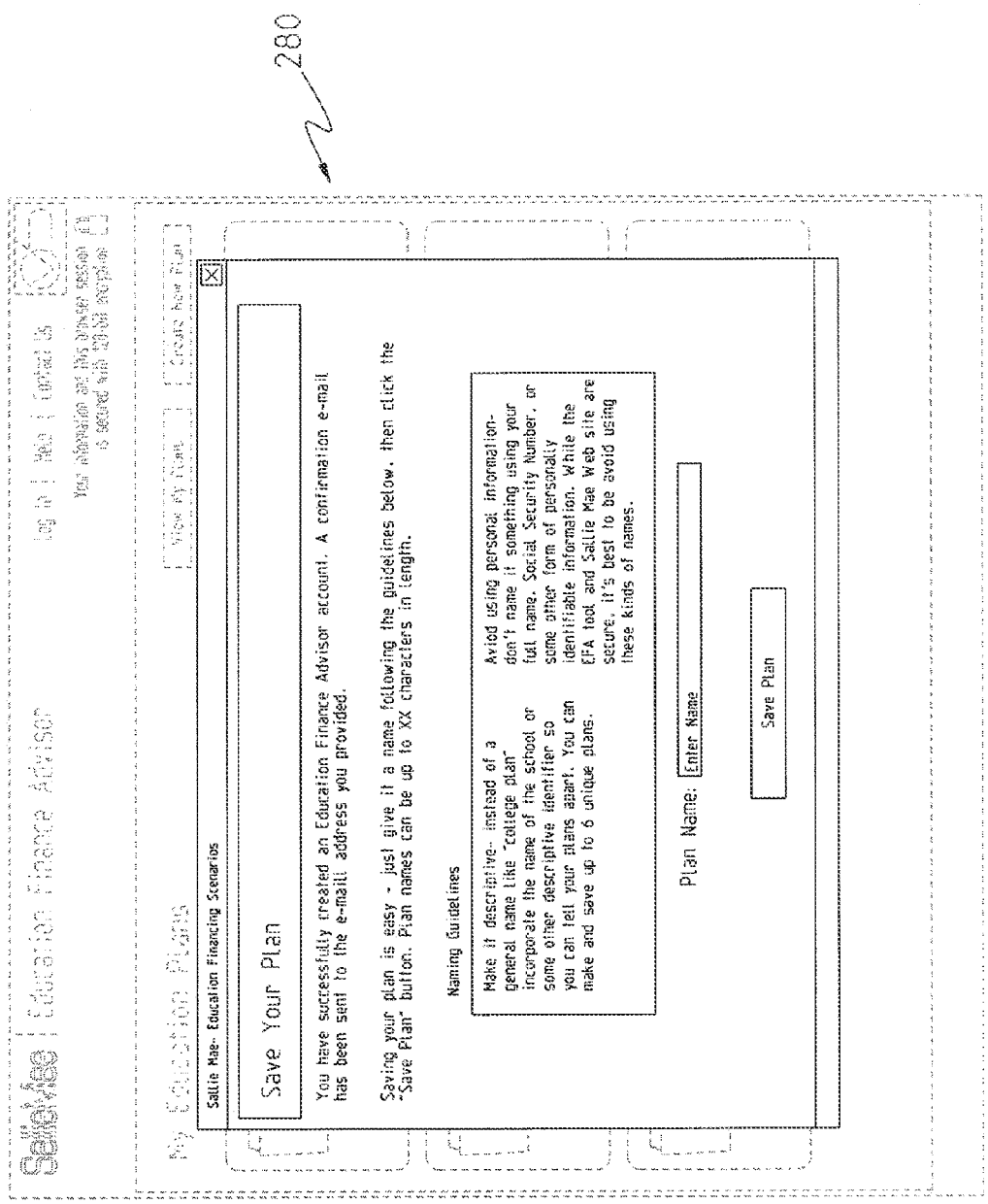
FIG. 28 shows a pop-up window of the system of FIG. 1 where a user saves a created educational financing plan.
Figure 29A:
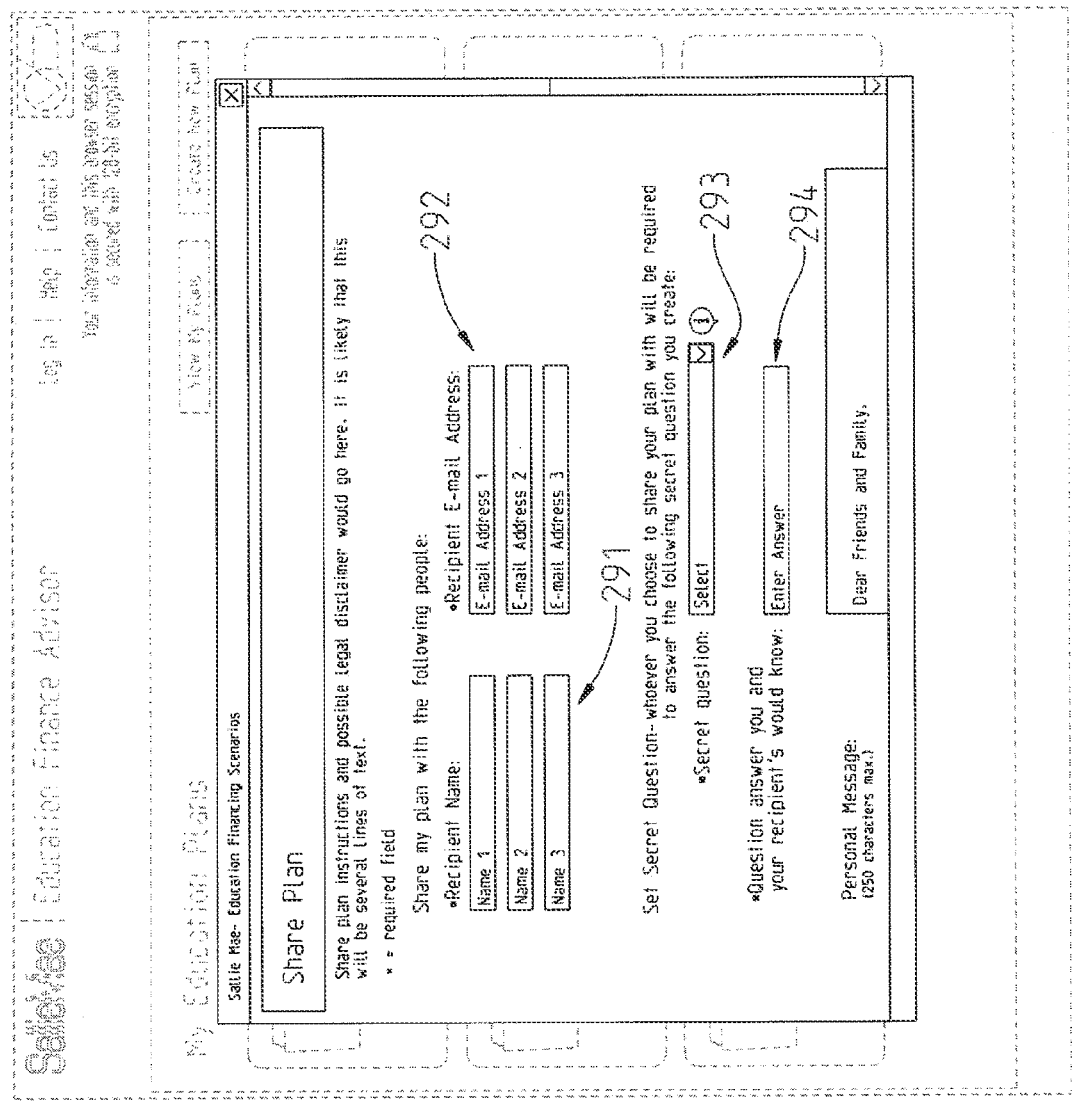
FIGS. 29 A&B show a pop-up window of the system of FIG. 1 where a user enters information for sharing a educational financing plan with others.
Figure 29B:
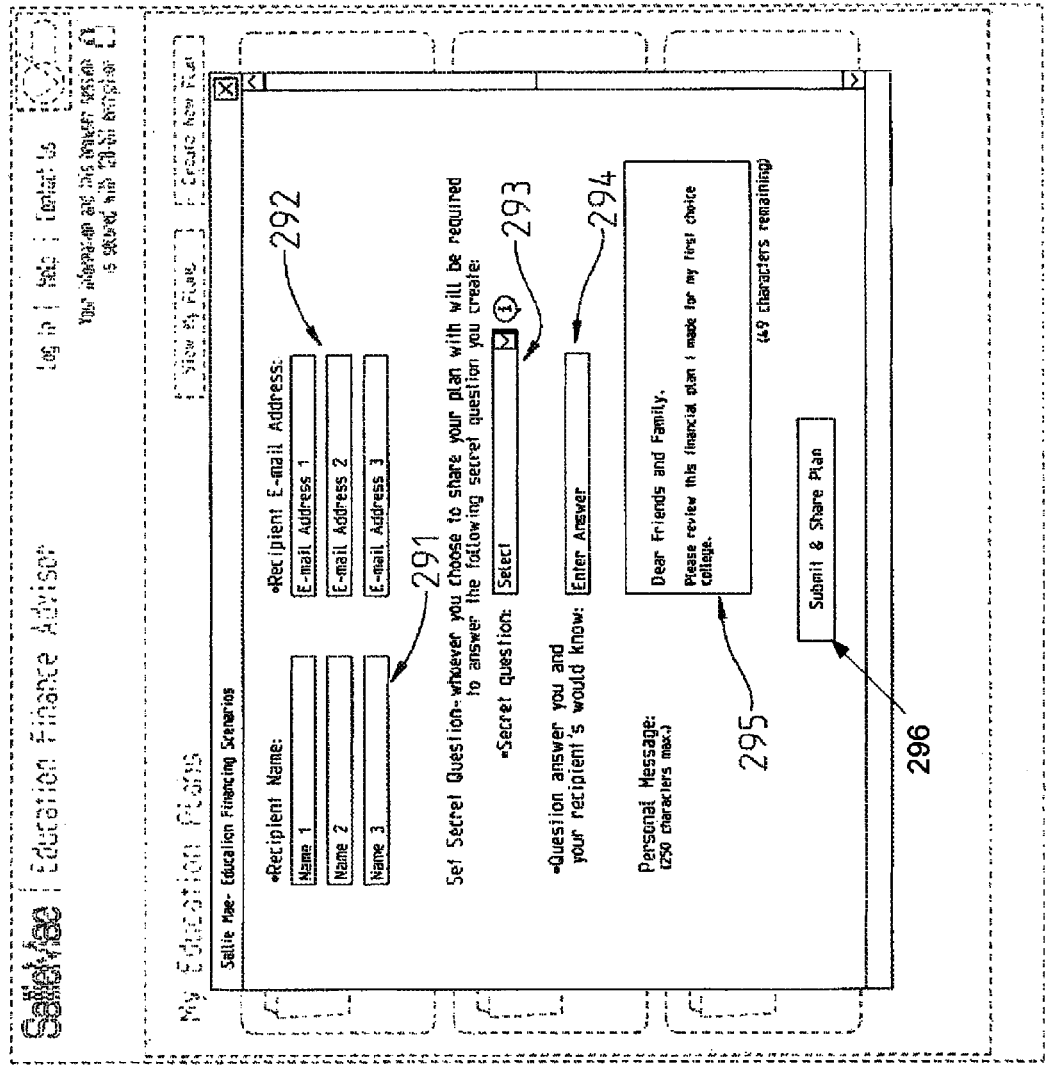

Upon selection of button 271 when registration is complete, or logging in after choosing to "Share Plan," as appropriate, the user is taken to webpage 280, FIG. 28 if the plan has not previously been saved, and to webpage 290, FIGS. 29 A&B if the webpage has been previously saved.

Webpage 280 allows the user to save the plan under a custom name. Webpage 280 also provides tips on naming the plan. Webpage 290 provides a form for identifying individuals with whom the plan should be shared. The user is asked to enter the name 291, and e-mail address 292 of the individuals with whom the plan is to be shared. The user is further asked to select a secret question 293 and answer 294 that would be known to the individuals with whom plan sharing is desired.

The user is also permitted to enter a personal message 295 that will be sent as part of an e-mail to the identified individuals. Once all information is entered, the user selects button 296 to send out an e-mail to the identified individuals that contains personal message 295 and a URL that allows the recipient to retrieve the shared plan.

Individuals who receive and follow the URL in the sent e-mail land at webpage 300, FIG. 30. Webpage 300 displays question 301 that was previously selected at 293 and requires the individual to enter the answer supplied at 294 in box 302. Successful answering of the question allows the individual to review the plan created by the user.

Accordingly, the above described system provides a method of assembling an educational financing package, determining a monthly payment based upon the assembled financing package for repayment of any loans that are part of the educational financing package, obtaining an estimate of income during the period when repayment would be occurring, comparing the income estimate to the determined monthly payment, and then assigning a risk level or tier based upon the income to monthly payment comparison.

Additionally, the above described system provides for assembling a financial package based on a completion schedule of differing lengths, including a five-year track. The estimation of income during the repayment period is at least partially based on the student's indicated course of study although other factors may be used and the user may provide input to alter the estimation of income.

The above described web-pages download modules to the user's computer. Computations are conducted on the user's computer via the modules. Accordingly, a webserver (not shown) that serves the webpages (12 et al) is not burdened with such computations.

The above described system presents an iterative approach to funding, with one funding source being fully explored before the next iteration that presents a different funding source/type. The provided example applies savings and income 121 as the first component of funding, in that maximizing the contribution of savings and income 121 minimizes expected loan payments. However, financing plans may be created where savings and income 121 are not exhausted and increased loans are assumed. Furthermore, the provided examples apply savings and income 121 evenly across each school year. However, financing plans may be created where a non-equal distribution of savings and income 121, such as being applied completely to first year 81 before being applied to second year 82 and before loan assumption, is utilized.

It should be appreciated that the system provides a graphical representation of the educational costs 81-84 and the funding sources 121, 151, 152, 181, 182 therefor. Additionally, each of costs 81-84 and sources 121, 151, 152, 181, 182 is displayed as a shape having an area that is substantially correlated to the dollar values it represents.

The exemplary embodiment allows saving up to six different plans that mix schools and mix funding sources, however, it should be appreciated that systems allowing more and less plan saving may be optionally implemented. Additionally, embodiments may be optionally implemented where a user may request repayment plans that provide the minimum monthly payment and/or the quickest payoff. Similarly, the user may request the minimum monthly payment and/or the quickest payoff possible while still staying within a desired risk level/tier, such as finding the quickest payoff plan while still remaining in the low risk level.

Additionally, the present system provides an interface for planning and estimating savings, parental or student, and allows the user to see the effects over time of different savings parameters. As discussed earlier, parental savings 91 and student savings 92 are entered as shown in FIG. 9 and later used as shown in FIG. 11 and otherwise. A savings planner 400 is shown in FIGS. 31-34. Planner 400 allows a user to input the number of children for which he/she is planning the funding of college. The funding particulars for each child are organized by each having their own tab 402, 404. Additional children and tabs are added by selecting to "add another child" link 406. The user inputs the child's name 408, state of residence 410, birth month 412, and birth year 414. The birth month 412 and birth year 414 are used to provide an estimated college start year based on typical school birth date cutoffs. The college start year is shown in a cell (not shown). The estimated college start year can be manually changed to reflect students that have been held-back or skipped grades.

The user then selects the school type 416, choosing from "private associates," "public associates," "private bachelors," and "public bachelors." The user also selects the "attendance type" 418 of in state or out of state. The selection of school type 416 and attendance type 418 brings up a box showing the projected total cost of education 419. This box is pre-populated with an estimated total college cost that takes into consideration the school type 416, attendance type 418, and the college start year. However, the user may enter a different number, if desired, such as a number obtained from webpage 80. Accordingly, if a more precise and specialized estimate of educational costs is known, such estimate can be used. The entered or pre-populated estimate is displayed on the right side as the projected total cost of education in the college start year 420.

The user is then able to input his/her education savings to date 422, future savings (monthly amount) 424, and estimated savings rate of return 426. These numbers 422, 424, 426 are then used to compute a total projected savings 428. The total projected savings 428 is overlaid in bar format on the projected total cost 420. Similarly, the user inputs the monthly amount that he/she expects to contribute during school 430. This amount is likewise summed up and overlaid on the projected total cost 420. Once all entries are filled, the user can choose to view plan results 432.

Figure 33:
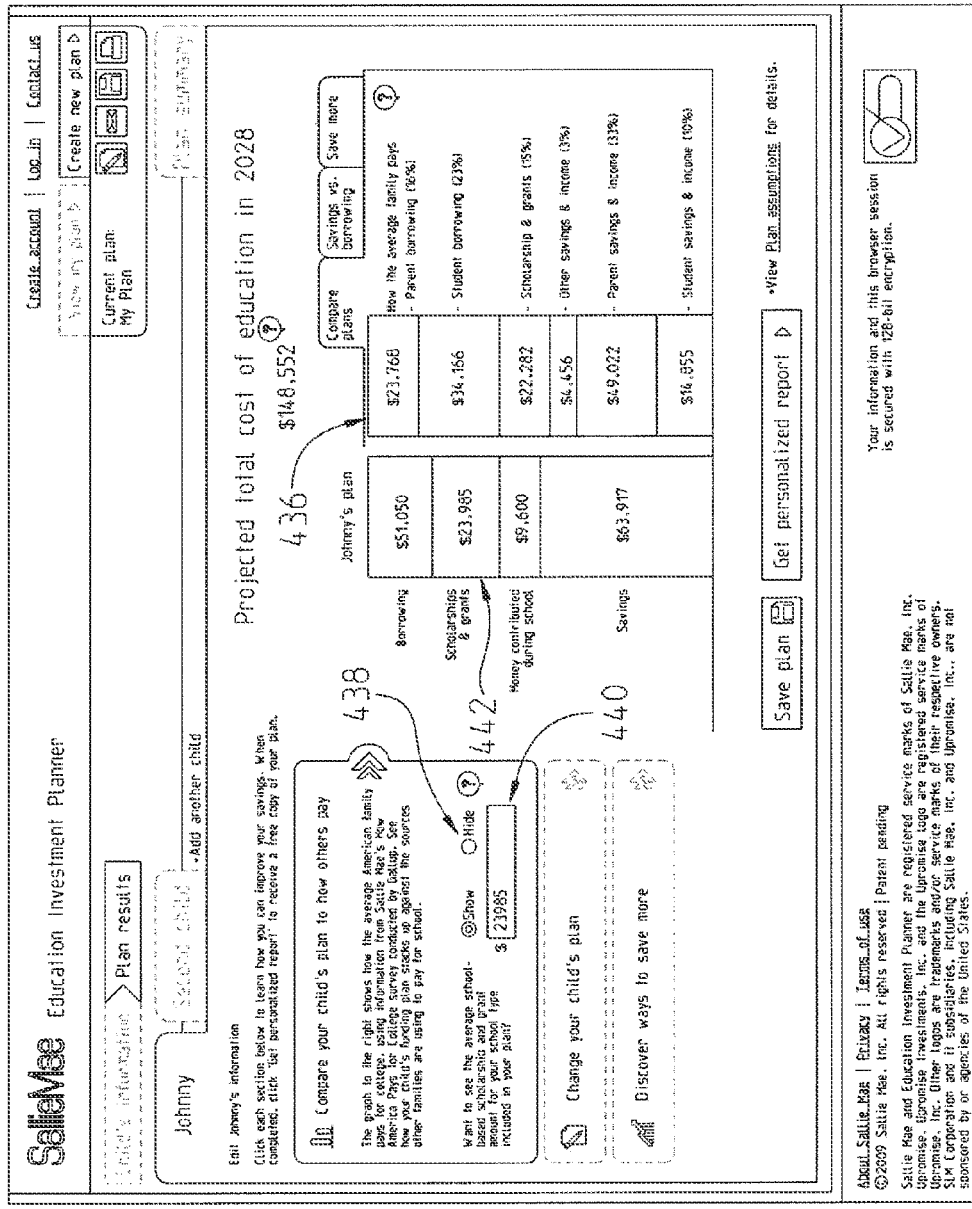
FIG. 33 is a page of the system of FIG. 1 where the user is presented with comparisons of the user's funding plan to funding plans of an average family.

Viewing the plan results involves webpage 434, shown in FIG. 33. The plan results allow the user to compare the created funding plan to the funding of the average American family 436. The data for the "average American family" is taken from Sallie Mae's How America Pays for College survey conducted by Gallup. The user is also presented with the option, buttons 438, to include the average school-based scholarship and grant amount for their selected school type in their funding plan. Again, a box 440 is provided with the average grant amount and the amount is able to be changed by the user. This amount is then overlaid onto the plan to provide a graphical representation of the total college costs and the funding sources 442.

Another feature related to webpage 140, FIG. 14, is in webpage 340 shown in FIG. 34. Whereas webpage 140 allows for input of an expected amount of Stafford and other federal loans, webpage 340 allows data from an actual financial aid award letter to be downloaded and inserted into the planning tool. Such an award letter is specific to a particular school. Link 342 is provided to download the award letter. Each portion of the award is shown to the user and is able to be selectively included or removed from the funding plan, area 344.

Figure 35:
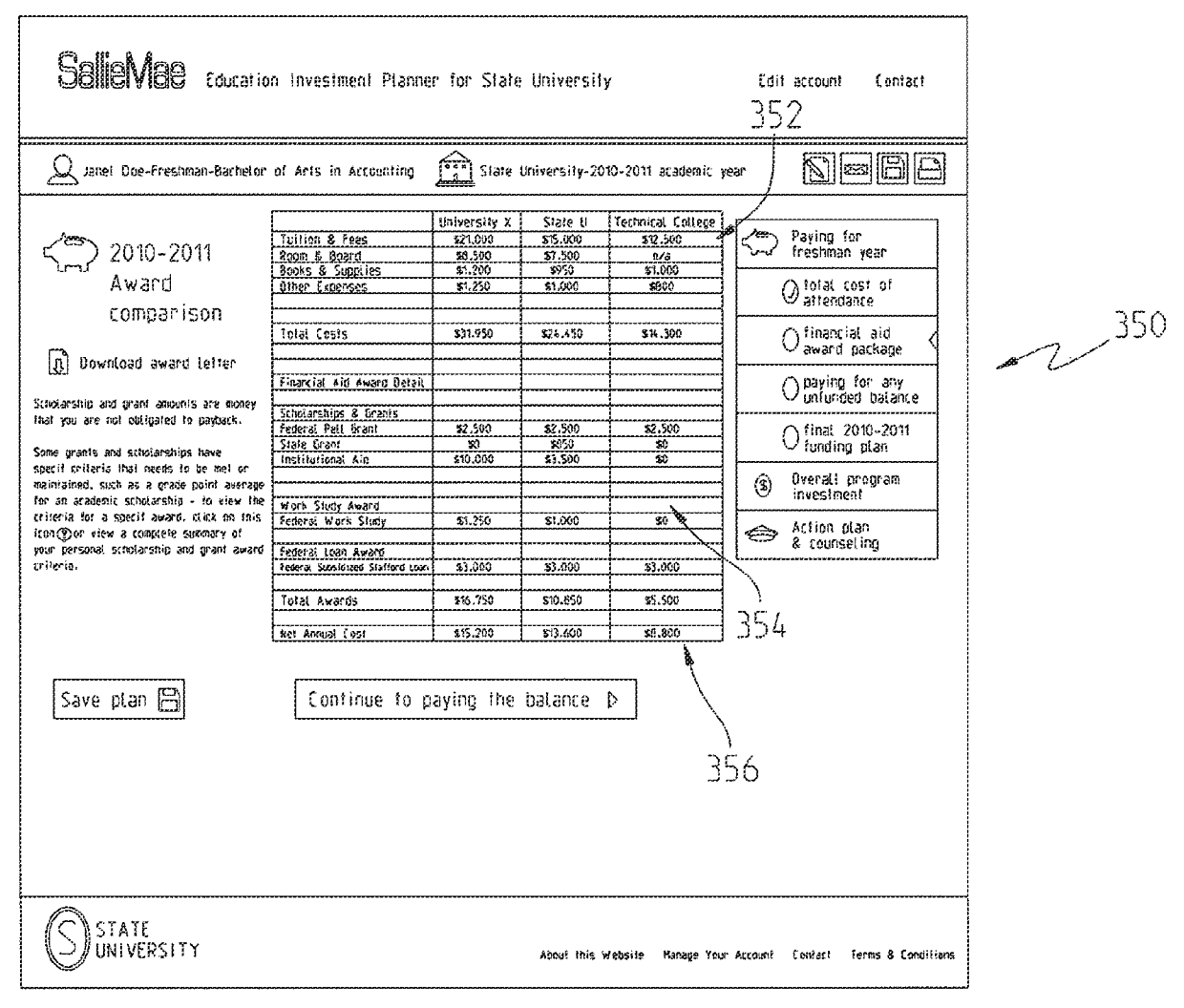

Often, when a user has reached the stage of having an actual financial aid award, the student has multiple educational institutions from which to choose. If financial aid has been applied for at each of the prospective institutions, separate financial aid awards and their corresponding letters are often available for each of the prospective institutions. Each individual award letter is downloaded via webpage 340. As shown in FIG. 35, web page 350 provides a side-by-side comparison of the costs 352, financial aid 354, and net annual costs 356 for each institution. Accordingly, a user can view the net annual costs and more easily make an assessment of the relative costs and value being considered.

Figure 36:
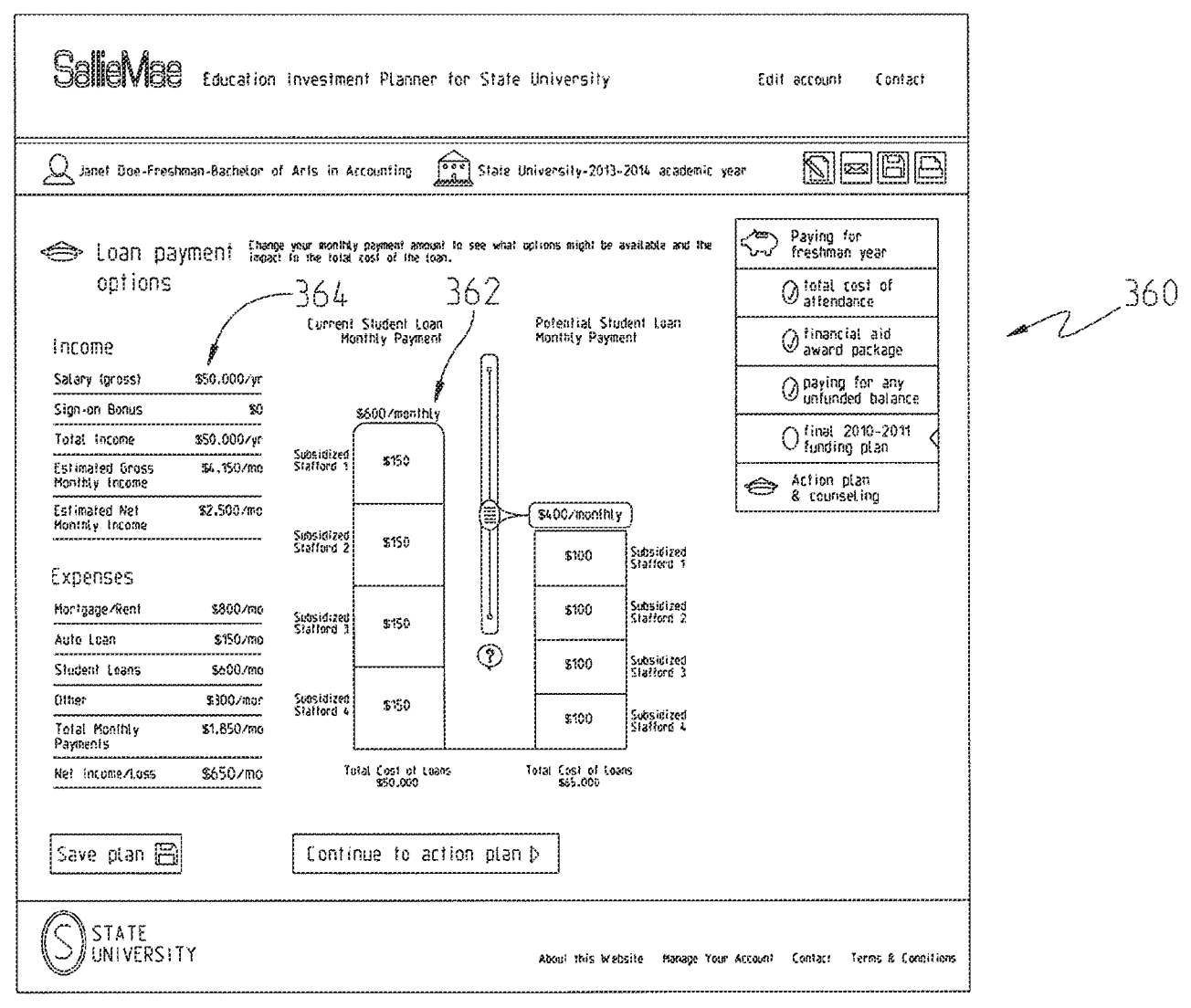

As previously discussed, webpages 200, 210 provide guidance regarding loan obligations, expected salary, and a categorization of the risk of default on the student loans. Webpage 360, FIG. 36, provides an alternative interface for planning payment. Additionally, webpage 360 can be used for review and maintenance of actual loan obligations. Review and maintenance of actual loan obligations is achieved through the download of actual loan information 362 via webpage 340 or otherwise. Webpage 360 allows a user to calculate every available repayment option for their loans. Webpage 360 also provides for the implementation of selections such that decisions made on webpage 360 are implemented to affect the payment schedule of the loans. Webpage 360 further acquires salary and other financial information 364 to allow for the loan obligations and payment options to be put into context of the cash-flow of the usually-graduated student. Guidance is provided on choosing a repayment option that is at least partially dependent upon the student's former course of study and anticipated current post-graduation needs. Furthermore, the guidance takes into account what type of graduate, undergraduate, medical, legal, etc, is being guided.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A method of electronically forming a customized educational financing plan including the steps of:
    presenting an educational financing planning website to a user, the website providing educational financing planning for a student;
    electronically obtaining educational institution information from the user, the information identifying an educational institution for which financial planning is desired, the information including an intended course of study;
    determining educational funding sources for the student including loans;
    determining a repayment amount for the loans;
    estimating a future income of the student at least partially based upon the identified intended course of study;
    comparing the repayment amount for the loans to the estimated future income; and
    classifying the financing plan as a specific risk level based upon the result of the comparing step;
    providing a data stream for displaying the plan and the risk level to the user.

2. The method of claim 1 wherein said classifying step includes classifying the financing plan as either high risk, medium risk, or low risk.

3. The method of claim 1 wherein said estimating step is at least partially based on the educational institution.

4. The method of claim 1 wherein obtaining step includes obtaining a specific identification of the educational institution, and said estimating step is at least partially based on the specific identified educational institution.

5. The method of claim 1, wherein the step of determining educational funding sources is at least partially based on average types and amounts of loans obtained by students attending the identified educational institution.

6. The method of claim 1, wherein the step of determining educational funding sources is at least partially based on data electronically imported from a financial aid award letter.

7. The method of claim 1, further including the step of saving the financing plan for later retrieval by the user.

8. The method of claim 1, wherein the user is the student.

9. The method of claim 1, further including the step of obtaining an anticipated enrollment year from the user.

10. The method of claim 9, further including the step of automatically calculating the expected cost of attendance for the identified educational institution starting in the anticipated year of enrollment.

11. The method of claim 1, further including the step of presenting costs and financial planning information for a plurality of schools in a side-by-side format, the financial planning information including electronically retrieved financial aid information from at least one financial aid award letter.

12. A method of electronically forming a customized educational financing plan including the steps of:
- presenting an educational financing planning website to a user, the website providing educational financing planning for a student;
- electronically obtaining first educational institution information from the user, the information identifying a first educational institution for which financial planning is desired, the information identifying an expected year of enrollment at the first institution;
- determining an expected cost for attending the first institution, the determination of expected cost being at least partially based on the identified first educational institution and the expected year of enrollment;
- electronically importing grant and loan award information from a financial aid award letter for the first educational institution;
- electronically obtaining second educational institution information from the user, the information identifying a second educational institution for which financial planning is desired, the information identifying an expected year of enrollment at the second institution;
- determining an expected cost for attending the second institution, the determination of expected cost being at least partially based on the identified second educational institution and the expected year of enrollment;
- electronically importing grant and loan award information from a financial aid award letter for the second educational institution;
- determining the net costs of attending the first and second educational institutions; and
- providing for the displaying of the costs, award information, and net costs for the first and second educational institutions.

13. The method of claim 12, wherein the step of providing for the displaying of the costs, award information, and net costs for the first and second educational institutions includes providing for the costs, the award information, and the net costs for the first and second educational institutions to be displayed side by side.

* * * * *